US008106818B2

(12) United States Patent
Bhattacharya et al.

(10) Patent No.: US 8,106,818 B2
(45) Date of Patent: Jan. 31, 2012

(54) POSITIONING SYSTEM AND POSITIONING METHOD

(75) Inventors: Tarun Kumar Bhattacharya, San Jose, CA (US); Hassan Mohamed El-Sallabi, Palo Alto, CA (US); Scot Douglas Gordon, Redmond, WA (US); Yasuhiro Oda, Kanagawa (JP); Jiyun Shen, Kanagawa (JP)

(73) Assignees: Polaris Wireless, Inc., Mountain View, CA (US); NTT DoCoMo, Inc., Tokyo (JP)

( * ) Notice: Subject to any disclaimer, the term of this patent is extended or adjusted under 35 U.S.C. 154(b) by 165 days.

(21) Appl. No.: 12/651,019

(22) Filed: Dec. 31, 2009

(65) Prior Publication Data
US 2011/0156952 A1 Jun. 30, 2011

(51) Int. Cl.
*G01S 19/48* (2010.01)
*G01S 19/46* (2010.01)
(52) U.S. Cl. .............................. 342/357.31; 342/357.29
(58) Field of Classification Search ............. 342/357.31, 342/357.29
See application file for complete search history.

(56) References Cited

U.S. PATENT DOCUMENTS

| 5,936,572 | A  | * | 8/1999  | Loomis et al. ........... 342/357.29 |
|-----------|----|---|---------|-------------------------------------|
| 6,603,428 | B2 | * | 8/2003  | Stilp ............................ 342/457 |
| 6,625,200 | B1 | * | 9/2003  | Dent ............................ 375/142 |
| 6,720,922 | B2 | * | 4/2004  | Williams et al. ............... 342/465 |
| 6,965,760 | B1 | * | 11/2005 | Chen et al. ................. 455/226.1 |
| 2003/0063028 | A1 | * | 4/2003 | Caswell et al. .......... 342/357.15 |
| 2004/0097237 | A1 | * | 5/2004 | Aoyama ....................... 455/445 |
| 2004/0174297 | A1 | * | 9/2004 | Cho .......................... 342/357.14 |
| 2005/0228589 | A1 | * | 10/2005 | Diggelen et al. ................... 702/1 |
| 2010/0057349 | A1 | * | 3/2010 | Akiyama ....................... 701/207 |
| 2010/0291947 | A1 | * | 11/2010 | Annamalai ................ 455/456.1 |
| 2010/0311480 | A1 | * | 12/2010 | Raines et al. .............. 455/575.7 |

FOREIGN PATENT DOCUMENTS

JP 07231473 8/1995

OTHER PUBLICATIONS

Sakai, Takeyasu, "GPS Technology Guide", Feb. 28, 2003, Publisher: Tokyo Denki University Press, Published in: JP.

* cited by examiner

*Primary Examiner* — Thomas Tarcza
*Assistant Examiner* — Frank McGue
(74) *Attorney, Agent, or Firm* — DeMont & Breyer, LLC

(57) ABSTRACT

It is an object of the present invention to perform positioning at the proper positioning time and positioning precision in response to a requirement with respect to positioning. A positioning server 10 comprises a first positioning component 12 that performs positioning of a cellular terminal 20 by a hybrid algorithm 1, in which indoor/outdoor determination is performed on the basis of reception state information indicating the reception state at the cellular terminal 20, and in which an end condition is determined on the basis of the result of the indoor/outdoor determination; and a second positioning component 13 that performs positioning of the cellular terminal 20 by a hybrid algorithm 2, in which the approximate position of the cellular terminal 20 is calculated on the basis of reception state information indicating the reception state at the cellular terminal 20, and in which whether or not to end the positioning of the cellular terminal 20 is decided on the basis of the precision of the approximated position.

9 Claims, 16 Drawing Sheets

*Fig.3*

| Requirement | Environment | Algorithm | $\sigma_{T\_in}$ (m) | $\sigma_{T\_out}$ (m) | $T_{max\_in}$ (s) | $T_{max\_out}$ (s) |
|---|---|---|---|---|---|---|
| Best Battery Life | All | HA2 | $\sigma_T = 150$ | | | |
| Best Time to Fix | All | HA2 | $\sigma_T = 2000$ | | | |
| Best Accuracy | All | HA1 | 0 | 0 | A-GPS Timeout Time | A-GPS Timeout Time |
| ... | | | | | | |
| Better Time to Fix | All | HA1 | 2000 | 2000 | Time To Acquire First NMR | Time to Acquire First NMR |
| Good Accuracy | Urban | HA1 | 150 | 75 | 20 | A-GPS Timeout Time |
| Good Time To Fix | Urban | HA1 | 250 | 150 | 5 | 15 |
| Good Accuracy | Suburban | HA1 | 250 | 100 | 10 | AGPS Timeout Time |
| Good Time to Fix | Suburban | HA1 | 500 | 200 | 5 | 15 |
| Good Accuracy | Rural | HA1 | 500 | 200 | 15 | AGPS Timeout Time |
| Good Time to Fix | Rural | HA1 | 700 | 400 | 5 | 15 |

POSITIONING SYSTEM AND POSITIONING METHOD

BACKGROUND OF THE INVENTION

1. Field of the Invention

The present invention relates to a positioning system and a positioning method for estimating the position of a receiver.

2. Related Background Art

There has been proposed in the past a technique for estimating the position of a cellular terminal (mobile communication terminal) or other such receiver on the basis of the reception strength (reception level) of the radio wave received by the receiver. Japanese Patent Application No. H7-231473, which is a Japanese laid-open patent application, discusses a technique for estimating the position of a receiver by taking information indicating the relation between the reception strength of a radio wave received from a specific base station and the position at which this radio wave was received, storing this information in a database, and using this database to match with reception strength.

Also known in the past was a technique for using a GPS (global positioning system) to find a receiver (see, for example, "Introduction to GPS Technology" by Takeyasu Isaka, Tokyo Denki University Publishing, Feb. 28, 2003). Another known method is AGPS (assisted GPS), in which positioning is performed by utilizing assist data indicating a satellite position, etc., acquired from a mobile unit communication network.

If finding a position by GPS should fail (that is, if the GPS positioning result is not fixed), base station positioning, in which a signal from a mobile unit communication network is used to perform positioning by pattern matching as mentioned above, or positioning called hybrid positioning, which combines a signal from a GPS satellite and a signal from a mobile unit communication network, is sometimes performed.

With conventional methods, however, whether or not positioning by GPS was successful could not be decided without actually commencing the positioning. Also, GPS positioning that entailed the above-mentioned decision took a long time. And a UE-based AGPS positioning method, in which computation is performed by the receiver, took an especially long time. For example, indoors where a signal cannot be received from a GPS satellite, after GPS positioning has proven impossible, the system switched to a different type of positioning such as base station positioning, so the overall positioning took a long time. In this case, the positioning precision is poor for how long the positioning takes. Also, in cities and the like, even outdoors the effect of multipulses can prevent good GPS positioning precision from being attained. Also, the proper positioning time and positioning precision will vary with how these positioning results are utilized.

SUMMARY OF THE INVENTION

The present invention was conceived in light of the above situation, and it is an object thereof to provide a positioning system and positioning method with which positioning can be performed at the proper positioning time and positioning precision according to a requirement with respect to positioning.

To achieve the stated object, the positioning system pertaining to the present invention is a positioning system for estimating the position of a receiver that has a wireless communication function and a receiving function for signals used in GPS positioning, the system comprising first positioning means for estimating the position of the receiver by a first positioning method, second positioning means for estimating the position of the receiver by a second positioning method, requirement information input means for inputting requirement information indicating a requirement with respect to estimation of the position of the receiver, and positioning method determination means for determining whether to execute the first or second positioning method on the basis of the requirement information inputted by the requirement information input means, and causing the first positioning means or the second positioning means to execute the estimation of the position of the receiver by the determined positioning method, wherein the first positioning means comprises first reception state information acquisition means for acquiring reception state information indicating the reception state of a radio wave by the wireless communication function in the receiver, first position estimation means for estimating the position of the receiver on the basis of the reception state information acquired by the first reception state information acquisition means and performing GPS positioning of the receiver on the basis of the reception state of a signal used in GPS positioning and received by the receiver, first end decision means for deciding whether or not to end the estimation of the position of the receiver by the first position estimation means on the basis of a specific end condition, and if it is decided not to end, causing the first position estimation means to estimate the position of the receiver also on the basis of new reception state information acquired by the first reception state information acquisition means at a different timing from that of the reception state information used to estimate the position by the first position estimation means, and deciding whether or not to end the position estimation by the first position estimation means also on the basis of whether or not GPS positioning by the first position estimation means has been ended, first indoor/outdoor determination means for determining whether the receiver is indoors or outdoors on the basis of the reception state information acquired by the first reception state information acquisition means, and first end condition determination means for determining the specific end condition on the basis of the result of determination by the first indoor/outdoor determination means, and the second positioning means comprises second reception state information acquisition means for acquiring reception state information indicating the reception state of the radio wave by the wireless communication function in the receiver, second approximate position estimation means for estimating an approximate position of the receiver on the basis of the reception state information acquired by the second reception state information acquisition means, and calculating the precision of the approximate position, second end decision means for deciding whether or not to end the estimation of the position of the receiver on the basis of the precision calculated by the second approximate position estimation means, and if it is decided to end, ending the estimation of the position of the receiver by using the approximate position estimated by the second approximate position estimation means as the position of the receiver, second indoor/outdoor determination means for determining whether the receiver is indoors or outdoors on the basis of the reception state information acquired by the second reception state information acquisition means, and second positioning control means for controlling the execution of GPS positioning of the receiver on the basis of the result of decision by the second end decision means and the result of determination by the second indoor/outdoor determination means.

With the positioning system pertaining to the present invention, requirement information indicating a requirement with respect to estimation of the position of a receiver is acquired, and either a first or second positioning method is executed on the basis of this requirement information. In the first positioning method, whether the receiver is indoors or outdoors is decided on the basis of reception state information about the receiver, and an end condition for the positioning is determined on the basis of this decision. Therefore, the end condition for positioning can be selected according to the situation, that is, if it is believed that the receiver is outdoors and higher positioning precision will be obtained by taking a relatively long time for positioning, or if it is believed that the receiver is indoors and higher positioning precision will not be obtained even if a relatively long time is taken for positioning. Thus, with the present invention, positioning can be performed at the proper positioning precision and in the proper positioning time according to whether the receiver is indoors or outdoors.

In the second positioning method, the approximate position of the receiver is estimated and the precision of the approximate position is computed on the basis of reception state information pertaining to the receiver. Whether or not to end the estimation of the position of the receiver is decided on the basis of the precision of this approximate position. Therefore, if the precision of the approximate position is sufficiently good, GPS positioning is not performed at this point, and the estimation of the position of the receiver is ended. Meanwhile, whether the receiver is indoors or outdoors is determined on the basis of reception state information pertaining to the receiver. The execution of GPS positioning is controlled on the basis of the decision about whether or not to end the estimation of the position of the receiver and the determination about whether the receiver is indoors or outdoors.

Therefore, control can be performed so that even if the receiver does not perform GPS positioning, if the approximate position has sufficient precision, or if GPS positioning is difficult to perform, GPS positioning is not executed, and otherwise GPS positioning is executed. Also, with the above positioning system, whether or not GPS positioning is performed can be controlled without actually performing GPS positioning, which takes a long time to decide if it has been executed. Specifically, with the positioning system pertaining to the present invention, a positioning result corresponding to the state of the receiver can be obtained in less time.

As discussed above, with the positioning system pertaining to the present invention, a positioning method corresponding to requirement information is decided and executed from among two positioning methods each having a different positioning time and positioning precision, so positioning can be performed at the proper positioning time and positioning precision according to a requirement with respect to positioning.

Preferably, the first end condition determination means determines the specific end condition also on the basis of the requirement information inputted by the requirement information input means. With this constitution, since a specific end condition is determined also on the basis of requirement information, the end condition for positioning can be determined better.

Preferably, the first end condition determination means acquires environment information indicating the environment in which the receiver is placed, and determines the specific end condition also on the basis of the environment information. With this constitution, since the end condition is determined also on the basis of the environment in which the receiver is placed, the end condition for positioning can be determined better still.

Preferably, the first reception state information acquisition means acquires strength information indicating the reception strength corresponding to an emission source of the radio wave as the reception state information, and the first position estimation means estimates the position of the receiver by storing in advance information indicating the relation between the position and reception strength of the radio wave corresponding to an emission source of the radio wave, and by comparing the strength information acquired by the first reception state information acquisition means with the information stored in advance. With this constitution, the position of the receiver can be reliably and favorably estimated on the basis of the radio wave received by the wireless communication function of the receiver.

The first end condition determination means preferably determines a threshold of positioning result error and/or an elapsed time of positioning as the specific end condition. With this constitution, the positioning end condition can be determined reliably and properly.

Preferably, the positioning system further comprises emission source positioning means for acquiring information indicating the size of a communication area of an emission source of the radio wave received by the receiver, estimating the position of the receiver on the basis of the size of the communication area, and deciding whether or not to cause the first positioning means or second positioning means to execute the estimation of the position of the receiver. With this constitution, the positioning result can be easily acquired according to the environment in which the receiver is placed.

Preferably, the second positioning control means controls the execution of positioning that estimates the position of the receiver on the basis of the result of decision by the second end decision means and the result of determination by the second indoor/outdoor determination means and also on the basis of new reception state information acquired by the second reception state information acquisition means, at a timing that differs from that of the reception state information used to estimate the approximate position by the second approximate position estimation means. With this constitution, the positioning result of the receiver can be obtained even when GPS positioning is not performed.

Preferably, the reception state information acquisition means acquires strength information indicating the reception strength corresponding to an emission source of the radio wave as the reception state information, and the estimation of the approximate position by the approximate position estimation means and the estimation of the position of the receiver which uses the reception state information and the execution of which is controlled by the positioning control means, are carried out by a method in which the position of the receiver is estimated by storing in advance information indicating the relation between the position and reception strength of the radio wave corresponding to the emission source of the radio wave, and by comparing the strength information acquired by the reception state information acquisition means with the information stored in advance. With this constitution, the position of the receiver can be reliably and favorably estimated on the basis of the radio wave received by the wireless communication function of the receiver.

The present invention can be described as an invention of a positioning system as discussed above, or it can be described as an invention of a positioning method as follows. Only the categories here are different, and the invention is substantially the same in both cases, as are the action and effect.

Specifically, the positioning method pertaining to the present invention is a positioning method for estimating the position of a receiver that has a wireless communication function and a receiving function for signals used in GPS positioning, the method comprising a first positioning step of estimating the position of the receiver by a first positioning method, a second positioning step of estimating the position of the receiver by a second positioning method, a requirement information input step of inputting requirement information indicating a requirement with respect to estimation of the position of the receiver, and a positioning method determination step of determining whether to execute the first or second positioning method on the basis of the requirement information inputted in the requirement information input step, and executing the estimation of the position of the receiver by the determined positioning method in the first positioning step or the second positioning step, wherein the first positioning step comprises a first reception state information acquisition step of acquiring reception state information indicating the reception state of a radio wave by the wireless communication function in the receiver, a first position estimation step of estimating the position of the receiver on the basis of the reception state information acquired in the first reception state information acquisition step, and performing GPS positioning of the receiver on the basis of the reception state of a signal used in GPS positioning and received by the receiver, a first end decision step of deciding whether or not to end the estimation of the position of the receiver in the first position estimation step on the basis of a specific end condition, and if it is decided not to end, estimating the position of the receiver in the first position estimation step also on the basis of new reception state information acquired in the first reception state information acquisition step at a different timing from that of the reception state information used to estimate the position in the first position estimation step, and deciding whether or not to end the position estimation in the first position estimation step also on the basis of whether or not GPS positioning in the first position estimation step has been ended, a first indoor/outdoor determination step of determining whether the receiver is indoors or outdoors on the basis of the reception state information acquired in the first reception state information acquisition step, and a first end condition determination step of determining the specific end condition on the basis of the result of determination in the first indoor/outdoor determination step, and the second positioning step comprises a second reception state information acquisition step of acquiring reception state information indicating the reception state of the radio wave by the wireless communication function in the receiver, a second approximate position estimation step of estimating an approximate position of the receiver on the basis of the reception state information acquired in the second reception state information acquisition step, and calculating the precision of the approximate position, a second end decision step of deciding whether or not to end the estimation of the position of the receiver on the basis of the precision calculated in the second approximate position estimation step, and if it is decided to end, ending the estimation of the position of the receiver by using the approximate position estimated in the second approximate position estimation step as the position of the receiver, a second indoor/outdoor determination step of determining whether the receiver is indoors or outdoors on the basis of the reception state information acquired in the second reception state information acquisition step, and a second positioning control step of controlling the execution of GPS positioning of the receiver on the basis of the result of decision in the second end decision step and the result of determination in the second indoor/outdoor determination step.

With the present invention, since the positioning method corresponding to requirement information is determined and executed from among two positioning methods each having a different positioning time and positioning precision, positioning can be performed at the proper positioning time and positioning precision in response to a requirement with respect to positioning.

BRIEF DESCRIPTION OF THE DRAWINGS

FIG. 3 is a table of information used for determining the positioning method;

DESCRIPTION OF THE PREFERRED EMBODIMENTS

Figure 1:
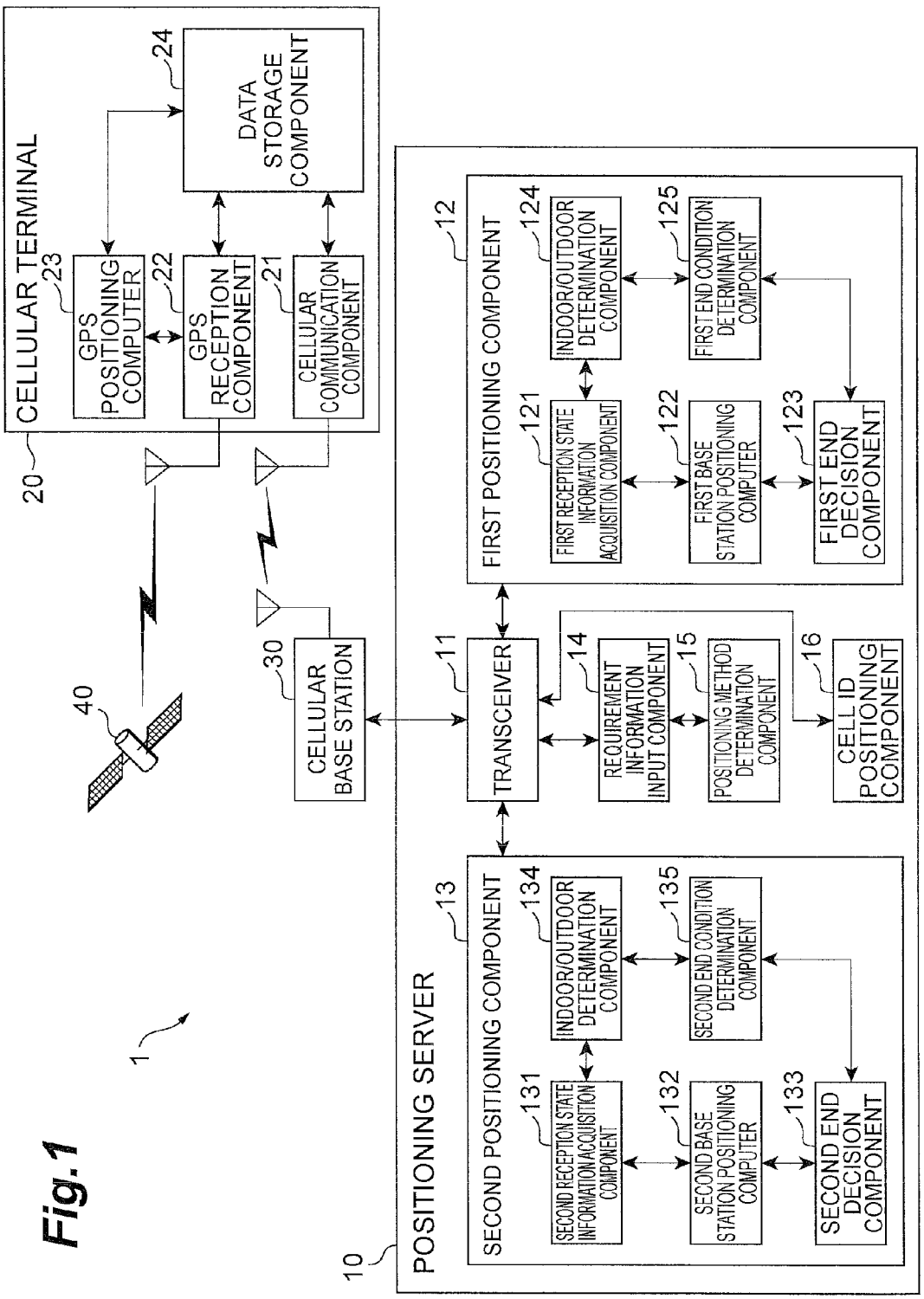
FIG. 1 is a diagram illustrating the functional configuration of a cellular terminal (receiver) and a positioning server constituting the positioning system pertaining to an embodiment of the present invention.

Preferred embodiments of the positioning system and positioning method pertaining to the present invention will now be described in detail along with the drawings. Those elements that are the same in the drawings will be numbered the same, and redundant description will be omitted.

FIG. 1 shows a positioning system 1 pertaining to this embodiment. A positioning system 1 is a system for estimating the position of a cellular terminal (mobile communication terminal) 20 that is the receiver pertaining to this embodiment, and comprises a positioning server 10 and the cellular terminal 20. The positioning server 10 is a device for estimating the position of the cellular terminal 20 (performing comprehensive processing). The (control of the) positioning of the cellular terminal 20 by the positioning server 10 is performed by using only the framework of a cellular communication system (mobile communication system). The positioning server 10 is connected with a plurality of cellular base stations 30 included in the cellular communication system, and can send and receive information to and from each of the cellular base stations 30. Communication with the cellular terminal 20 can also be performed via the cellular base stations 30. The positioning server 10 may also be included in a cellular communication system (mobile communication system).

The cellular terminal 20 that is the object of positioning will be described before the positioning server 10 pertaining to this embodiment is described in detail. The cellular terminal 20 is a device that has a wireless communication function and a receiving function for signals used in GPS positioning (AGPS positioning). The cellular terminal 20 also has a function that performs GPS positioning computation. More specifically, the cellular terminal 20 comprises a cellular communication component 21, a GPS reception component 22, a GPS positioning computer 23, and a data storage component 24, as shown in FIG. 1.

The cellular communication component 21 is a means for performing cellular communication (mobile unit communication) by wireless communication between the plurality of cellular base stations 30 included in the cellular communication network (mobile unit communication network) of the cellular communication system. The cellular communication component 21 is provided with an antenna for cellular communication, and this antenna is used to perform cellular communication. The cellular communication component 21 performs ordinary cellular communication such as telephone communication, and also acquires information by cellular communication used for positioning of its own terminal 20 in the positioning server 10. How this information is acquired will be discussed in more specific terms below. The cellular communication component 21 stores the acquired information in the data storage component 24.

Also, the cellular communication component 21 sends and receives information to and from the positioning server 10 via the cellular base stations 30 (cellular communication network). The cellular communication component 21 sends the positioning server 10 information that is stored in the data storage component 24 and used by the positioning server 10 for positioning, and more specifically, the measurement report information (discussed below). Information sent from the cellular communication component 21 to the positioning server 10 includes information indicating the GPS positioning result (discussed below), information related to wireless communication (discussed below), or information for producing information related to wireless communication. This transmission is triggered by user operation of the terminal 20 or by a request from the positioning server 10, for example, when the cellular terminal 20 is being positioned.

The GPS reception component 22 is a means for receiving a signal that is sent from a GPS satellite 40 and used for positioning. The GPS reception component 22 is provided with an antenna for receiving signals from a GPS satellite, and this antenna is used to perform reception. The GPS reception component 22 stores information related to the signals received from GPS satellites 40 and used in GPS positioning computation, in the data storage component 24.

The GPS satellites 40 are located at specific places corresponding to the time of day, and send positioning signals from this location. More specifically, four or five of the GPS satellites 40 are disposed in six orbits at an altitude of approximate position 20,000 Km, and move along their orbits as time passes. The positioning signals sent by the GPS satellites 40 include identification information for identifying a specific GPS satellite 40, information indicating the orbit of the GPS satellites 40, and information indicating the time a signal was sent.

The GPS positioning computer 23 is one of first and second position estimation means for calculating by GPS positioning the position of the terminal 20 on the basis of the reception state of a signal from a GPS satellite 40 received by the GPS reception component 22. More specifically, the GPS positioning computer 23 acquires information about a signal received by the terminal 20 from a GPS satellite 40, which is received by the GPS reception component 22 and stored in the data storage component 24. Then, the GPS positioning computer 23 computes from this information the location of the GPS satellite 40, the distance form the cellular terminal 20 to the GPS satellite 40, and so forth, and computes the location of the terminal 20. For this computation, assist data acquired from the cellular communication system and indicating the location of the GPS satellite 40, etc., may be used (in which case the positioning will be AGPS (assisted GPS)). The starting and ending of the reception of signals from the GPS satellite 40 by the GPS reception component 22 and the GPS positioning computation by the GPS positioning computer 23 are triggered, for example, by the receipt of an instruction from the positioning server 10 by the cellular terminal 20, which will be discussed below.

The GPS positioning computer 23 sends information indicating the computed location of the terminal 20 to the positioning server 10 as information about the positioning result of GPS positioning. If computation of the location of the terminal 20 by GPS positioning should fail, the GPS positioning computer 23 sends the positioning server 10 a notification to this effect. This information is included in the measurement report information that is sent.

The data storage component 24 holds information used for positioning and acquired by the cellular communication component 21 and the GPS reception component 22. The above is the functional configuration of the cellular terminal 20.

Information about the position of a cellular terminal 20 estimated by a positioning system 1 is utilized by applications (software) executed by the cellular terminal 20 or by a server or the like that provides information to the cellular terminal 20. More specifically, the estimated position of the cellular terminal 20 is used for navigation, providing information corresponding to the position of the user, or the like. These applications have different requirements pertaining to the applications themselves and to estimating the position of the cellular terminal 20 according to application settings and so forth. Examples of such requirements include reducing the battery consumption of the cellular terminal 20 (so as to allow continuous positioning over a longer time), and improving positioning precision. In this embodiment, when the positioning system 1 performs positioning of the cellular terminal 20, information indicating a requirement pertaining to positioning is acquired by a positioning server 10, such as receiving information transmitted from a positioning requirement source (such as the cellular terminal 20).

Figure 2:
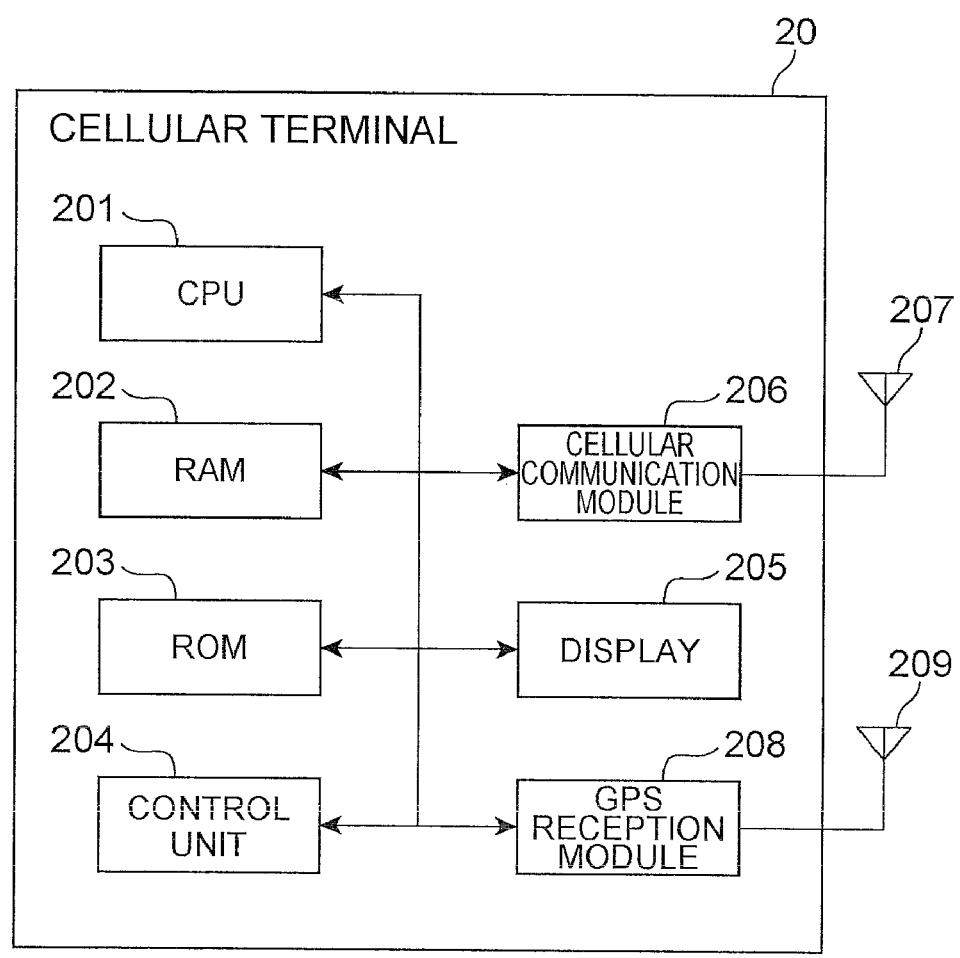
FIG. 2 is a diagram illustrating the hardware configuration of a cellular terminal (receiver) pertaining to an embodiment of the present invention.

FIG. 2 illustrates the hardware configuration of a cellular terminal 20 pertaining to this embodiment. As shown in FIG. 2, the cellular terminal 20 is made up of a CPU (central processing unit) 201, a RAM (random access memory) 202, a ROM (read only memory) 203, a control unit 204, a display 205, a cellular communication module 206, a cellular communication antenna 207, a GPS reception module 208, a GPS reception antenna 209, and other such hardware. The functions mentioned above are exhibited when these constituent elements operate. The above is the constitution of the cellular terminal 20.

The positioning server 10 will now be described. As shown in FIG. 1, the positioning server 10 comprises a transceiver 11, a first positioning component 12, a second positioning component 13, a requirement information input component 14, a positioning method determination component 15, and a cell ID positioning component 16.

The transceiver 11 is a means for sending and receiving information to and from the cellular terminal 20 via a cellular base station 30. The transceiver 11 outputs information received from the cellular terminal 20 to the first positioning component 12, the second positioning component 13, the requirement information input component 14, or the cell ID positioning component 16 according what the information is.

The first positioning component 12 is a first positioning means for estimating the position of the cellular terminal 20 with a hybrid algorithm 1 that is a first positioning method. The second positioning component 13 is a second positioning means for estimating the position of the cellular terminal 20 with a hybrid algorithm 2 that is a second positioning method. The hybrid algorithms 1 and 2 will be described in further detail below, but each has the following characteristics.

The hybrid algorithm 1 optimizes the positioning time and positioning precision, but since GPS positioning and pattern matching positioning are executed simultaneously, the power consumption of the cellular terminal 20 (battery consumption) is greater. The hybrid algorithm 2 executes GPS positioning and pattern matching positioning alternately, so positioning time and positioning precision cannot be optimized, but the power consumption of the cellular terminal 20 is lower. Also, as will be discussed in further detail below, since an approximate position is also utilized, the positioning time is shorter. As mentioned above, the hybrid algorithms 1 and 2 have different characteristics in terms of their positioning time and positioning precision and the power consumption of the cellular terminal 20.

The requirement information input component 14 is a requirement information input means for inputting requirement information indicating a requirement with respect to estimation of the position of the cellular terminal 20. More specifically, this requirement pertains to the positioning time, the positioning precision, the battery life of the cellular terminal 20, and so forth. More specifically, examples include best battery life (so that the battery life of the cellular terminal 20 is as long as possible), best time-to-fix (so that the positioning time is as short as possible), and best positioning precision (so that the positioning precision is as high as possible). Other examples include better battery life, better time-to-fix, better precision, good battery life, good time-to-fix, good precision, and other such requirements including the priority of elements.

More specifically, the requirement information input component 14 inputs requirement information by receiving information transmitted from a positioning requirement source (such as the cellular terminal 20). The above-mentioned requirement is usually determined on the basis of an application setting or the application itself in which the positioning result is used. The requirement information input component 14 outputs the inputted requirement information to the positioning method determination component 15.

The positioning method determination component 15 is a positioning method determination means for determining whether to execute the hybrid algorithm 1 or the hybrid algorithm 2 on the basis of the requirement information inputted from the requirement information input component 14. More specifically, the positioning method determination component 15 determines the positioning method on the basis of information in the table shown in FIG. 3, which is stored ahead of time in the positioning server 10. The information in the table shown in FIG. 3 is information that is associated with requirement information (information in the first column of the table) and the positioning method (information in the third column of the table) (information other than the information in the table shown in FIG. 3 will be discussed below). In FIG. 3, the "HA1" and "HA2" listed as positioning methods indicate hybrid algorithm 1 and hybrid algorithm 2, respectively.

The positioning method determination component 15 refers to the table in FIG. 3 and determines the positioning method associated with the requirement information inputted from the requirement information input component 14 to be the positioning method that will be executed. The positioning method determination component 15 causes the first positioning component 12 or the second positioning component 13 to execute the estimation of the position of the cellular terminal 20 by the determined positioning method. If positioning is executed by the first positioning component 12, then the positioning method determination component 15 inputs to the first positioning component 12 the requirement information used for determining the positioning end condition.

The cell ID positioning component 16 is an emission source positioning means for acquiring information indicating the size of a communication area of the cellular base station 30, which is an emission source of radio waves received by the cellular terminal 20, and estimates the position of the receiver on the basis of the size of the communication area. The cell ID positioning component 16 decides whether or not to cause the first positioning system 12 or second positioning component 13 to execute the estimation of the position of the cellular terminal 20 on the basis of information indicating the size of the communication area.

More specifically, the cell ID positioning component 16 performs estimation of the position of the cellular terminal 20 as follows. The cell ID positioning component 16 acquires, via the transceiver 11, the cell ID of the cellular base station 30 that is the emission source of the radio wave received by the cellular terminal 20. The cell ID may be acquired from MR just as above, or, in this case, since there is no need for reception strength information, etc., it may be sent separately from the cellular terminal 20. The cell ID used here pertains to a single cell, and if the MR includes information about a plurality of cells, then information about the cell with the highest reception strength above a specific reception strength is used.

Then the cell ID positioning component 16 estimates the radius R of the cell (the size of the cell), which is the communication area of the cellular base station 30 pertaining to the cell ID. The estimation of the cell radius R is performed in the same way as in a conventional method. For instance, a cell radius database storing information indicating the cell radius corresponding to the cell ID is held in advance in the cell ID positioning component 16, and the cell radius R is estimated on the basis of this. Alternatively, information indicating the positional relation of the cell is stored in advance, and information for the adjacent cell is used to estimate the cell radius R.

The cell ID positioning component 16 compares the estimated cell radius R with a threshold dr that was stored in advance. If the cell ID positioning component 16 decides that the estimated cell radius is below the threshold dr, it can be estimated that the cellular terminal 20 is located at the position of that cell (the position of the cellular base station 30), and that cell ID is used as the positioning result. The threshold dr is suitably set according to the required precision of positioning with respect to the cellular terminal 20. Usually, if the required precision is relatively low, the threshold dr is set relatively large. If the cell ID positioning component 16 decides that the estimated cell radius is not below the threshold dr, then the positioning result is that the position cannot be estimated by cell ID.

As discussed below, the estimation of the position of the cellular terminal 20 using a cell ID is performed as the first processing in the estimation processing for the position of the cellular terminal 20. This is because if the position of the cellular terminal 20 can estimated with such simple computation and information, then pattern matching position computation and GPS positioning computation need not be performed.

If the cell ID positioning component 16 can estimate the position of the cellular terminal 20 by cell ID, then the estimated position is used as the final positioning result, and it is decided to end estimation of the position of the cellular terminal 20. Specifically, the cell ID positioning component 16 decides whether or not to end the estimation of the position on the basis of the cell radius. If the cell ID positioning component 16 is not successful at estimating the position of the cellular terminal 20 by cell ID, then it is decided not to end estimation of the position of the cellular terminal 20, and it is decided to have the first positioning component 12 or the second positioning component 13 execute estimation of the position of the cellular terminal 20.

If the cell ID positioning component 16 decides to end the estimation of the position of the cellular terminal 20, it sends a signal that halts the processing for positioning with respect to the cellular terminal 20 via the transceiver 11, in the same manner as described later. Alternatively, since the estimation of the position of the cellular terminal 20 using cell ID is performed as the first processing in the estimation processing for the position of the cellular terminal 20, if the cell ID positioning component 16 decides not to end the estimation of the position of the cellular terminal 20, it may send a signal that begins processing for GPS positioning and pattern matching positioning with respect to the cellular terminal 20 via the transceiver 11. In that case, the elapsed time of positioning described later is counted from that point.

The first positioning component 12 that executes a hybrid algorithm 1 will now be described in detail. As shown in FIG. 1, the first positioning component 12 comprises a first reception state information acquisition component 121, a first base station positioning computer 122, a first end decision component 123, a first indoor/outdoor determination component 124, and a first end condition determination component 125.

The first reception state information acquisition component 121 is first reception state information acquisition means for acquiring, via the transceiver 11, reception state information sent from the cellular terminal 20 and indicating the reception state of a radio wave produced by the cellular communication component 21 at the cellular terminal 20. Strength information indicating the reception strength corresponding to the cellular base station 30 that is the emission source of the radio wave is used as the reception state information. More specifically, measurement report information (hereinafter abbreviated as MR) including identification information for the cellular base stations 30 (cell ID, base station ID, etc.), which is information measured at the cellular terminal 20, is used. In addition to identification information for the cellular base stations 30, the MR includes information indicating the signal transmission lag (such as the RTT (round trip time)) and the reception strength (reception level) of the received signal associated with the pertinent identification information, information indicating the amount of attenuation, the amount of interference, etc., whether or not GPS positioning is possible, and so forth. Upon acquiring the MR, the first reception state information acquisition component 121 outputs the MR to the first base station positioning calculator 122 and the indoor/outdoor determination component 124. The acquisition of MR is carried out intermittently, such as at regular time intervals.

The first base station positioning calculator 122 is one of first position estimation means for estimating the position of the cellular terminal 20 on the basis of the MR acquired by the first reception state information acquisition component 121. The estimation of the position of the cellular terminal 20 based on MR is performed by the method given in the above-mentioned Japanese Patent Application No. H7-231473, which involves positioning calculation by pattern matching. Specifically, the first base station positioning calculator 122 stores, in a database or the like, information indicating the relation between the reception strength of the radio wave received from a specific cellular base station 30 and the location where this radio wave is received. The first base station positioning calculator 122 matches the information stored in this database with the reception strength corresponding to the cellular base station 30 indicated by the MR, and the location associated with the reception strength of a pattern similar to the reception strength indicated by the MR is termed the location of the cellular terminal 20.

The first base station positioning calculator 122 estimates the location of the cellular terminal 20 as discussed above, and also estimates the positioning error of this location. The estimation of positioning error here is carried out in the same manner as the estimation of positioning error by a conventional positioning method that involves pattern matching. The first base station positioning calculator 122 computes, for example, the degree of match Pi between the reception strength of the MR and the reception strength associated with each location stored in the database. Then, the first base station positioning calculator 122 computes the positioning error Ei using the following function, for example, in which Pi is a variable.

$$Ei = A/Pi$$

Here, A is a system parameter stored in advance by the first base station positioning calculator 122. As an example of how Pi is computed, it is possible to use the Euclid distance between a measurement result M and a database D. We will let i be a number that uniquely identifies a position coordinate in the database, and let j be a base station number received by measurement, and Pi is calculated by the following formula for all the position coordinates i in the database.

$$Pi = \frac{1}{\sqrt{\sum_j (M_j - D_{i,j})^2}}$$

The position where Pi is greatest is the position with the best match. It is also possible to use the size of the grid in the database for A. That is, the distance between adjacent positions in the database is used as A.

The first base station positioning calculator 122 uses a plurality of MR to perform positioning calculation when a plurality of MR are acquired in positioning of the cellular terminal 20 one time. More specifically, the first base station positioning calculator 122 averages the reception strength of the radio wave indicated by a plurality of MR for each of the cellular base stations 30, and uses the averaged reception strength to perform matching. In pattern matching positioning, measurement is repeated at the cellular terminal 20, and increasing the number of MR has the effect of eliminating fluctuation in the measurement result caused by measurement error or multipulses, so positioning precision is improved. As discussed below, the MR is sent to the positioning server 10 every time MR is measured at the cellular terminal 20, so the first base station positioning calculator 122 performs pattern matching positioning calculation every time this happens. The first base station positioning calculator 122 outputs to the first end decision component 123 information indicating the location of the cellular terminal 20 obtained by pattern matching positioning calculation, and information indicating the calculated positioning error.

The first end decision component 123 is first end decision means for deciding whether or not to end the estimation of the position of the cellular terminal 20 on the basis of a specific end condition. More specifically, every time pattern matching positioning computation is performed, the first end decision component 123 decides the end of pattern matching positioning and GPS positioning as follows. First, the first end decision component 123 decides whether or not GPS positioning has ended. A positioning result for GPS positioning is sent from the cellular terminal 20 to the positioning server 10, and it is decided whether or not this has been received by the transceiver 11 and inputted to the first end decision component 123. If the GPS positioning result has been inputted to the first end decision component 123, then the first end decision component 123 decides that GPS positioning has ended. If it has been decided that GPS positioning has ended, it is decided to end the estimation of the position of the cellular terminal 20. In this case, the first end decision component 123 uses the positioning result for GPS positioning as the position of the cellular terminal 20.

Moreover, the end decision component 123 decides whether or not to end the estimation of the position of the cellular terminal 20 by deciding whether or not the positioning error of the positioning result obtained by pattern matching positioning computation by the base station positioning calculator 122 is below a threshold $\sigma_T$ as the specific end condition. If the end decision component 123 decides that the positioning error is less than that threshold $\sigma_T$, it decides to end the estimation of the position of the cellular terminal 20. This means that positioning is ended when the positioning result obtained by pattern matching positioning computation by the base station positioning calculator 122 satisfies a specific positioning precision. The threshold $\sigma_T$ is determined by the end condition determination component 125 as described below. In this case, the end decision component 123 uses the positioning result from pattern matching positioning as the position of the cellular terminal 20.

The end decision component 123 also decides whether or not to end the estimation of the position of the cellular terminal 20 by deciding whether or not the positioning elapsed time is greater than a threshold T as the specific end condition. If the end decision component 123 decides that the positioning elapsed time is greater than the threshold T, it decides to end the estimation of the position of the cellular terminal 20. The positioning elapsed time is measured by the positioning server 10, and is the elapsed time from the start of positioning with respect to the cellular terminal 20. The threshold T is determined by the end condition determination component 125 as described below. In this case, the end decision component 123 uses the positioning result for pattern matching positioning as the position of the cellular terminal 20.

As discussed above, if the end decision component 123 decides to end the estimation of the position of the cellular terminal 20, it sends a signal that halts positioning processing to the cellular terminal 20 via the transceiver 11. Specifically, it sends a signal that halts the reception of signals from the GPS satellite 40, GPS positioning computation, and the measurement of MR. Also, the end decision component 123 outputs information indicating the position of the cellular terminal 20 estimated as above, corresponding to the usage details, such as sending it to the cellular terminal 20.

In the above-mentioned decision, if it is decided not to end the estimation of the position of the cellular terminal 20 (if it is not decided to end it), the first end decision component 123 instructs the first base station positioning calculator 122 to perform pattern matching positioning computation on the basis of new MR acquired at a different timing from that of the MR used in the pattern matching positioning performed by the first base station positioning calculator 122. Specifically, when new MR is acquired by the first reception state information acquisition component 121, the first base station positioning calculator 122 is instructed to use that MR as well to perform pattern matching positioning computation of the cellular terminal 20. However, active control of the first base station positioning calculator 122 from the first end decision component 123 does not necessarily have to be performed, and the system may be such that pattern matching positioning computation is performed by not performing positioning end processing as above.

Figure 4:
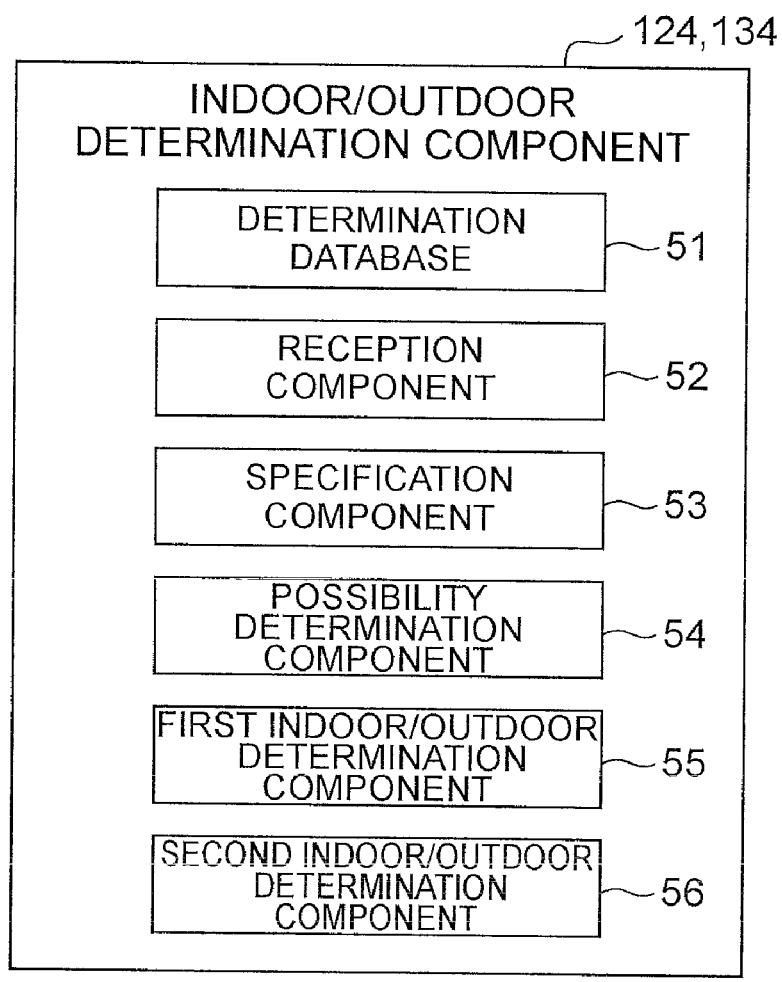
FIG. 4 is a diagram illustrating the functional configuration of an indoor/outdoor determination component.

The indoor/outdoor determination component 124 is an indoor/outdoor determination means for determining whether the cellular terminal 20 is indoors or outdoors on the basis of the MR inputted from the first reception state information acquisition component 121. As shown in FIG. 4, the indoor/outdoor determination component 124 more specifically comprises a determination database 51, a reception component 52, a specification component 53, a possibility determination component 54, a first indoor/outdoor determination component 55, and a second indoor/outdoor determination component 56.

Figure 5:
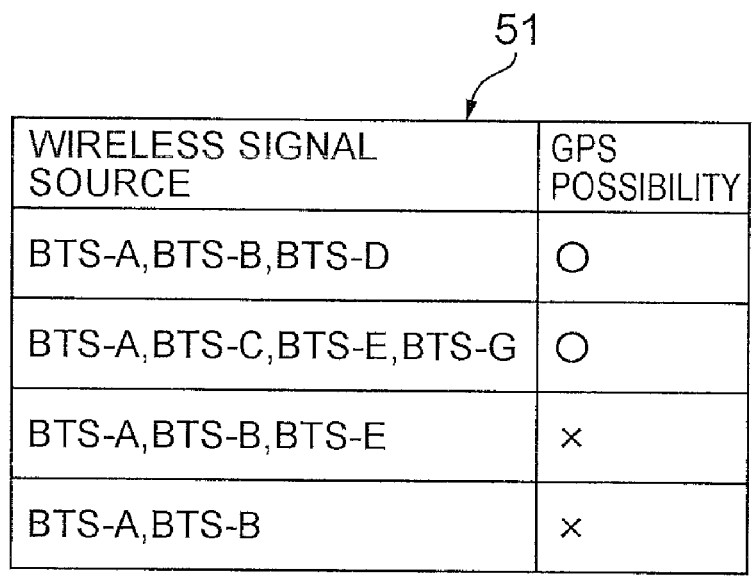
FIG. 5 is a table illustrating an example of information stored in a determination database.

As shown in FIG. 5, the determination database 51 stores combined information for identification information about an outdoor emission source that is assumed to be the emission source (cellular base station 30) of the signals received simultaneously by the cellular terminal 20, and indoor/outdoor characteristic information expressing the indoor or outdoor characteristics of the cellular terminal 20 at the time of signal receipt (as an example here, this is information expressing whether or not GPS positioning is possible (hereinafter referred to as GPS possibility information)), with these groups of information associated. FIG. 5 shows, for example, results from when signals are received simultaneously from emission sources BTS-A, BTS-B, and BTS-D, in which case it is indicated that GPS positioning is possible, and results from when signals are received simultaneously from emission sources BTS-A, BTS-B, and BTS-E, in which case it is indicated that GPS positioning is not possible. The configuration of the determination database 51 will be discussed below.

The reception component 52 receives from the cellular terminal 20 MR that includes information identifying the emission source of the received signal. The specification component 53 specifies the number N of emission sources of received signals from the received MR. The possibility determination component 54 determines whether or not the emission source number N is equal to or greater than the minimum emission source number M at which indoor/outdoor determination is possible on the basis of a first indoor/outdoor determination method (discussed below). The minimum emission source number M is a preset value.

The first indoor/outdoor determination component 55 executes indoor/outdoor determination on the basis of the first indoor/outdoor determination method when the emission source number N is equal to or greater than the minimum emission source number M (that is, when indoor/outdoor determination is possible on the basis of the first indoor/outdoor determination method). An example of the indoor/outdoor determination based on the first indoor/outdoor determination method here is to calculate the approximate position of the cellular terminal 20 by referring to a positioning database in which MR from the cellular terminal 20 has been stored in advance, and determine indoors or outdoors on the basis of whether or not there is a contradiction between the measurement data in the MR and the predicted data in the approximate position.

The second indoor/outdoor determination component 56 executes indoor/outdoor determination on the basis of a second indoor/outdoor determination method (discussed below) when the emission source number N is less than the minimum emission source number M (that is, when indoor/outdoor determination is impossible on the basis of the first indoor/outdoor determination method).

The indoor/outdoor determination component 124 outputs the result of determining whether the cellular terminal 20 is indoors or outdoors to the first end condition determination component 125 shown in FIG. 1.

The first end condition determination component 125 is first end condition determination means for determining the specific end condition used in the decision by the first end decision component 123 on the basis of the result of determination by the indoor/outdoor determination means 124. The first end condition determination component 125 determines a threshold $\sigma_T$ for positioning error of the above-mentioned pattern matching, and a threshold T for the elapsed time of the positioning. If the result of determination by the indoor/outdoor determination component 124 is that the cellular terminal 20 is located indoors, the first end condition determination component 125 sets the threshold $\sigma_T$ (relatively) high and the threshold T (relatively) low. On the other hand, if the result of determination by the indoor/outdoor determination component 124 is that the cellular terminal 20 is located outdoors, the first end condition determination component 125 sets the threshold $\sigma_T$ (relatively) low and the threshold T (relatively) high. This is because when the cellular terminal 20 is located outdoors, higher positioning precision will be obtained by taking a relatively long time for positioning, and if the cellular terminal 20 is located indoors, higher positioning precision will not be obtained even if a relatively long time is taken for positioning.

Also, as the result of determination by the indoor/outdoor determination component 124, for example, a value $d_i$ that is continuous between 0 and 1 is outputted as the extent to which the cellular terminal 20 is indoors, the threshold $\sigma_T$ and the threshold T may be determined by the following formulas. Here, $d_i=0$ means outdoors, and $d_i=1$ means indoors.

$$\sigma_T = d_i(\sigma_{PM} - \sigma_{AGPS}) + \sigma_{AGPS}$$

$$T = d_i(T_0 - T_i) + T_i$$

Here, $\sigma_{AGPS}$ and $\sigma_{PM}$ express the thresholds of positioning error for AGPS positioning and pattern matching positioning, respectively. $T_i$ and $T_0$ express the control times indoors and outdoors, respectively. These values may be system parameters stored by the first end condition determination component 125 ahead of time. These values may also be calculated each time by individual functions using the estimated cell radius R. For example, $\sigma_{AGPS}$ and $T_0$ are strictly increasing functions of R, and $\sigma_{PM}$ and $T_i$ are strictly decreasing functions of R. The first end condition determination component 125 outputs information indicating the determined end condition to the first end decision component 123.

The first end condition determination component 125 may also decide a specific end condition on the basis of requirement information inputted by the requirement information input component 14. Furthermore, the first end condition determination component 125 may acquire environment information indicating the environment in which the cellular terminal 20 is placed, and decide a specific end condition on the basis of the environment information. Examples of the environment in which the cellular terminal 20 is placed include those in which the cellular terminal 20 setting is urban, suburban, or rural.

The acquisition of environment information is performed, for example, by making a determination on the basis of a positioning database stored in the first base station positioning computer 122 from MR data transmitted from the cellular terminal 20. More specifically, the cellular terminal 20 acquires information indicating the cell distance from the cellular base station 30 (to the adjacent cellular base station 30) that has received radio waves, and determines the environment on the basis of this cell distance. For instance, the setting is determined to be urban if the cell distance is below a specific threshold. The environment information may be acquired from the cellular terminal 20, in addition to being acquired by determination as above.

In specific terms, the determination of the end condition is performed on the basis of the information in the table shown in FIG. 3 and stored ahead of time in the positioning server 10. The information in the table shown in FIG. 3 is information in which requirement information (the information in the first column of the table) and environment information (the information in the second column of the table) are associated with information indicating the end condition (the information in the fourth to seventh columns of the table).

Of the information indicating the end condition shown in the table of FIG. 3, $\sigma_{T\_in}$ (the information in the fourth column of the table) is the threshold $\sigma_T$ (in units of meters) of pattern matching positioning error when the cellular terminal 20 was located indoors. $\sigma_{T\_out}$ (the information in the fifth column of the table) is the threshold $\sigma_T$ (in units of meters) of pattern matching positioning error when the cellular terminal 20 was located outdoors. $T_{max\_in}$ (the information in the sixth column of the table) is the threshold T (in units of seconds) of elapsed positioning time when the cellular terminal 20 was located indoors. $T_{max\_out}$ (the information in the seventh column of the table) is the threshold T (in units of seconds) of elapsed positioning time when the cellular terminal 20 was located outdoors. "A-GPS Timeout time" in FIG. 3 is the timeout time of AGPS positioning preset and stored in the positioning server 10. "Time to Acquire First NMR" is the time until the first MR data is acquired.

The first end condition determination component 125 refers to the table in FIG. 3 and uses an end condition associated with a combination of the acquired environment information and the requirement information inputted by the requirement information input component 14. When the table of FIG. 3 is used, the end condition is determined by a combination of requirement information and environment information, but the end condition may instead be determined by either the requirement information or the environment information. If the end condition is determined as discussed above, then since the end condition is determined on the basis of requirement information and environment information in addition to indoor/outdoor determination, the proper end condition for positioning is determined. The above is the constitution of the first positioning component 12.

Next, the second positioning component 13 that executes the hybrid algorithm 2 will be described in detail. As shown in FIG. 1, the second positioning component 13 comprises a second reception state information acquisition component 131, a second base station positioning computer 132, a second end decision component 133, a second indoor/outdoor determination component 134, and a second end condition determination component 135.

The second reception state information acquisition component 131 acquires, via the transceiver 11, reception state information indicating the reception state of radio waves by a cellular communication component 21 in the cellular terminal 20. The second reception state information acquisition component 131 has the same function as the first reception state information acquisition component 121 of the first positioning component 12. When MR data is acquired, the second reception state information acquisition component 131 outputs this MR data to the second base station positioning computer 132 and the second indoor/outdoor determination component 134. The acquisition of MR data is carried out continually, such as at regular intervals.

The second base station positioning computer 132 is one second position estimation means for estimating the position of the cellular terminal 20 on the basis of MR data acquired by the second reception state information acquisition component 131. The second base station positioning computer 132 performs pattern matching positioning computation by the same function as the first base station positioning computer 122 of the first positioning component 12. The second base station positioning computer 132 outputs information indicating the position of the cellular terminal 20 obtained by pattern matching positioning computation, and information indicating the calculated positioning error to the second end decision component 133.

The second base station positioning calculator 132 is second approximate position estimation means for estimating the approximate position of the cellular terminal 20 and also computing the precision of this approximate position by the above-mentioned pattern matching positioning method from the MR initially acquired in positioning of the cellular terminal 20. The above-mentioned positioning error is used as the precision of the approximate position. The second base station positioning calculator 132 outputs information about the approximate position found as above to the second end decision component 133. The calculation of the approximate position does not necessarily have to be based on a single MR, and may instead be based on MR from a number of times. Since the approximate position is found in a short time along with the determination of indoors or outdoors as discussed below, it may be found on the basis of the same information as that used for the determination of indoors or outdoors.

The second end decision component 133 is second end decision means for deciding whether or not to end the estimation of the position of the cellular terminal 20 on the basis of specific end conditions. More specifically, the second end decision component 133 decides whether or not to end the estimation of the position of the cellular terminal 20 on the basis of the precision of the approximate position of the cellular terminal 20 estimated by the second base station positioning calculator 132. The second end decision component 133 makes its decision based on the precision of the approximate position by deciding whether or not the positioning error of the approximate position indicated by the information inputted from the second base station positioning calculator 132 is less than a threshold. If the second end decision component 133 decides that the positioning error is below the threshold, it decides that the precision of the approximate position is adequate, and ends the estimation of the position of the cellular terminal 20. The above-mentioned threshold is a value stored in advance in the second end decision component 133, and is suitably set according to the required precision of the cellular terminal 20. In this case, the second end decision component 133 terms the approximate position to be the position of the cellular terminal 20.

As discussed above, if the second end decision component 133 decides to end the estimation of the position of the cellular terminal 20, it sends a signal that halts positioning processing to the cellular terminal 20 via the transceiver 11. Specifically, it sends a signal that halts the reception of signals from the GPS satellite 40, the GPS positioning computation, and the measurement of MR. There may be an instruction to commence processing pertaining to GPS positioning when the positioning server 10 decides that GPS positioning is to be performed, as discussed below. Also, the second end decision component 133 outputs information indicating the position of the cellular terminal 20 estimated as above, corresponding to the usage details, such as sending it to the cellular terminal 20.

If the second end decision component 133 decides that the positioning error is not below the threshold, it decides that the precision of the approximate position is insufficient, and does not end the estimation of the position of the cellular terminal 20. In the above-mentioned decision, if it is decided not to end the estimation of the position of the cellular terminal 20 (if it is not decided to end it), either pattern matching positioning or GPS positioning is carried out as discussed below. In that case, the second end decision component 133 decides to end the positioning as discussed below. Also, the second end decision component 133 outputs to the second positioning controller 135 information about the result of deciding whether or not to end positioning processing on the basis of the approximate position.

When GPS positioning is performed, more specifically, the second end decision component 133 decides to end the estimation of the position of the cellular terminal 20 upon receiving notification of the GPS positioning result from the cellular terminal 20. If the notification from the cellular terminal 20 is to the effect that the GPS positioning succeeded and a positioning result has been obtained by GPS positioning (if the GPS positioning is fixed), the second end decision component 133 uses the above-mentioned approximate position as the position of the cellular terminal 20. On the other hand, if the notification from the cellular terminal 20 is to the effect that GPS positioning failed and a positioning result has not been obtained by GPS positioning (if GPS positioning is not fixed), the second end decision component 133 uses the above-mentioned approximate position as the position of the cellular terminal 20. Also, if there is no notification from the cellular terminal 20 even after a specific length of time has elapsed (such as a preset specific time), the second end decision component 133 uses the above-mentioned approximate position as the position of the cellular terminal 20. Also, the second end decision component 133 outputs information indicating the position of the cellular terminal 20 estimated as above, corresponding to the usage details, such as sending it to the cellular terminal 20.

When pattern matching positioning is performed, or more specifically, when pattern matching is performed on the basis of new MR and the positioning result is inputted from the second base station positioning calculator 132 to the second end decision component 133, the second end decision component 133 decides to end the estimation of the position of the cellular terminal 20. In that case, the positioning error in pattern matching positioning does not necessarily have to be calculated. Alternatively, the second end decision component 133 may make a decision as follows. Every time pattern matching positioning computation is performed by the second base station positioning calculator 132, the second end decision component 133 decides as follows to end the pattern matching positioning. The second end decision component 133 decides whether or not to end the estimation of the position of the cellular terminal 20 by deciding whether or not the positioning error of the positioning result obtained by pattern matching positioning computation by the second base station positioning calculator 132 is below a threshold $\sigma_T$. If the second end decision component 133 decides that the positioning error is less than that threshold $\sigma_T$, it decides to end the estimation of the position of the cellular terminal 20. This means that positioning is ended when the positioning result obtained by pattern matching positioning computation by the second base station positioning calculator 132 satisfies a specific positioning precision. The threshold $\sigma_T$ is a value that is stored in the second end decision component 133 in advance, and is suitably set according to the required precision of the cellular terminal 20. In this case, the second end decision component 133 uses the positioning result from pattern matching positioning as the position of the cellular terminal 20.

The second end decision component 133 also decides whether or not to end the estimation of the position of the cellular terminal 20 by deciding whether or not the positioning elapsed time is greater than a threshold T. If the second end decision component 133 decides that the positioning elapsed time is greater than the threshold T, it decides to end the estimation of the position of the cellular terminal 20. The positioning elapsed time is measured by the positioning server 10, and is the elapsed time from the start of positioning with respect to the cellular terminal 20. The threshold T is a value that is stored in the second end decision component 133 in advance, and is suitably set according to the allowable positioning time. In this case, the second end decision component 133 uses the positioning result for pattern matching positioning as the position of the cellular terminal 20. By making the above decisions, a more precise positioning result can be obtained by pattern matching positioning. The above-mentioned thresholds $\sigma_T$ and T may be determined by the same method as with the first end condition determination component 125 discussed above, using the table of FIG. 3 and based on requirement information and environment information.

As discussed above, if the second end decision component 133 decides to end the estimation of the position of the cellular terminal 20, it sends a signal that halts positioning processing to the cellular terminal 20 via the transceiver 11. Specifically, it sends a signal that halts the measurement of MR. Also, the second end decision component 133 outputs information indicating the position of the cellular terminal 20 estimated as above, corresponding to the usage details, such as sending it to the cellular terminal 20.

In the above-mentioned decision, if it is decided not to end the estimation of the position of the cellular terminal 20 (if it is not decided to end it), the second end decision component 133 instructs the second base station positioning calculator 132 to perform pattern matching positioning computation on the basis of new MR acquired at a different timing from that of the MR used in the pattern matching positioning performed by the second base station positioning calculator 132. Specifically, when new MR is acquired by the second reception state information acquisition component 131, the second base station positioning calculator 132 is instructed to use that MR as well to perform pattern matching positioning computation of the cellular terminal 20. However, active control of the second base station positioning calculator 132 from the second end decision component 133 does not necessarily have to be performed, and the system may be such that pattern matching positioning computation is performed by not performing positioning end processing as above.

The indoor/outdoor determination component 134 is second indoor/outdoor determination means for determining whether the cellular terminal 20 is indoors or outdoors on the basis of the MR inputted from the second reception state information acquisition component 131. The indoor/outdoor determination component 134 has the same function as that of the indoor/outdoor determination component 124 of the first positioning component 12. The indoor/outdoor determination component 134 outputs the result of determining whether the cellular terminal 20 is indoors or outdoors to the second positioning controller 135 shown in FIG. 1.

The second positioning controller 135 is second positioning control means for controlling the execution of GPS positioning of the cellular terminal 20 on the basis of the result of deciding the approximate position by the second end decision component 133 and the result of determination by the indoor/outdoor determination component 134. More specifically, the second positioning controller 135 does not execute any positioning control when positioning is ended as a result of the decision by the second end decision component 133 about the approximate position.

If the result of deciding the approximate position by the second end decision component 133 is that positioning is not ended, and the result of determination by the indoor/outdoor determination component 134 is that the cellular terminal 20 is located outdoors, then the second positioning controller 135 controls so as to execute GPS positioning of the cellular terminal 20. In that case, more specifically, the second positioning controller 135 sends a control signal to the cellular terminal 20 that executes GPS positioning. Alternatively, if the reception of a signal from the GPS satellite 40, GPS positioning computation, and MR measurement have already been performed, which are processing for positioning in the cellular terminal 20, then the second positioning controller 135 may send the cellular terminal 20 a signal that does not halt processing for GPS positioning (reception of signals from the GPS satellite 40 and GPS positioning computation), but does halt processing other than GPS positioning (MR measurement).

On the other hand, if the result of deciding the approximate position by the second end decision component 133 is that positioning is not ended, and the result of determination by the indoor/outdoor determination component 134 is that the cellular terminal 20 is located outdoors, then the second positioning controller 135 controls so as to execute pattern matching positioning of the cellular terminal 20. As mentioned above, since pattern matching positioning is performed with calculation of the approximate position as well, the second positioning controller 135 does not halt this processing (no need for active control).

Alternatively, active control may be performed such that the second positioning controller 135 sends the cellular terminal 20 a control signal to acquire MR and send it to the positioning server 10, and pattern matching positioning computation is performed by the second base station positioning calculator 132 once MR is received by the positioning server 10. Alternatively, if the reception of a signal from the GPS satellite 40, GPS positioning computation, and MR measurement have already been performed, which are processing for positioning in the cellular terminal 20, then the second positioning controller 135 may send the cellular terminal 20 a signal that does not halt processing for pattern matching positioning (MR measurement), but does halt processing other than pattern matching positioning (reception of a signal from the GPS satellite 40 and GPS positioning computation). The above is the functional configuration of the positioning server 10.

Figure 6:
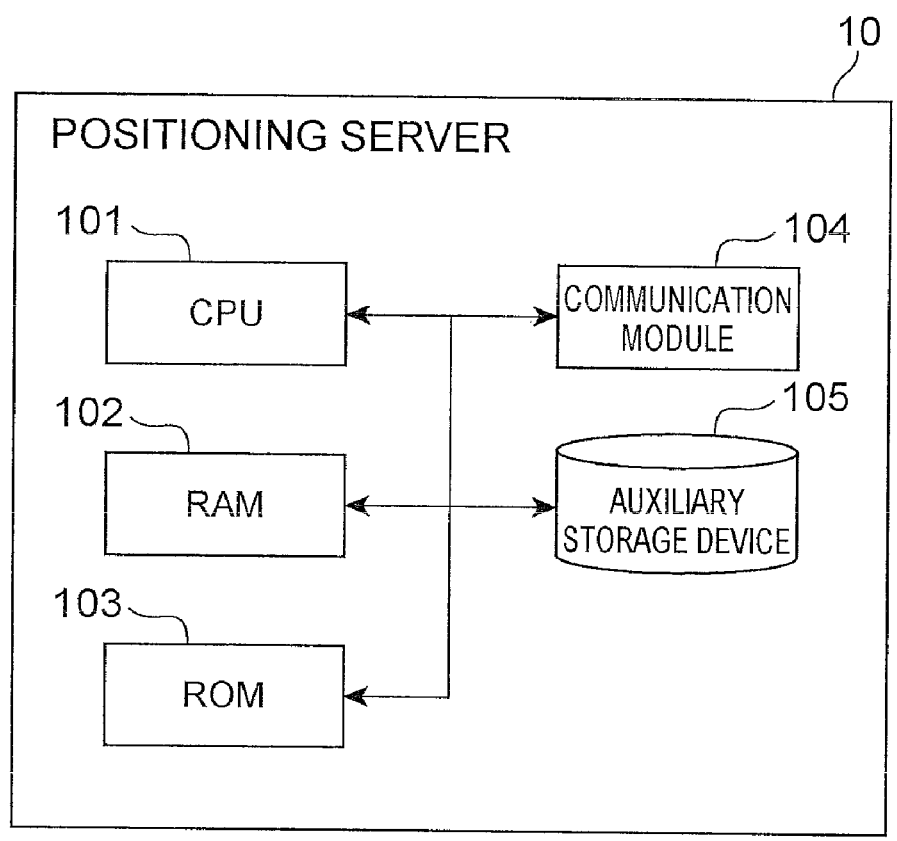
FIG. 6 is a diagram illustrating the hardware configuration of a positioning server pertaining to an embodiment of the present invention.

FIG. 6 shows the hardware configuration of the positioning server 10. As shown in FIG. 6, the positioning server 10 is constituted to include a computer that comprises a CPU 101, a RAM 102 and ROM 103 (main storage devices), a communication module 104 for performing communication, a hard disk or other such auxiliary storage device 105, and other such hardware. These constituent elements operate under programs or the like, thereby exhibiting the functions of the positioning server 10.

Figure 11:
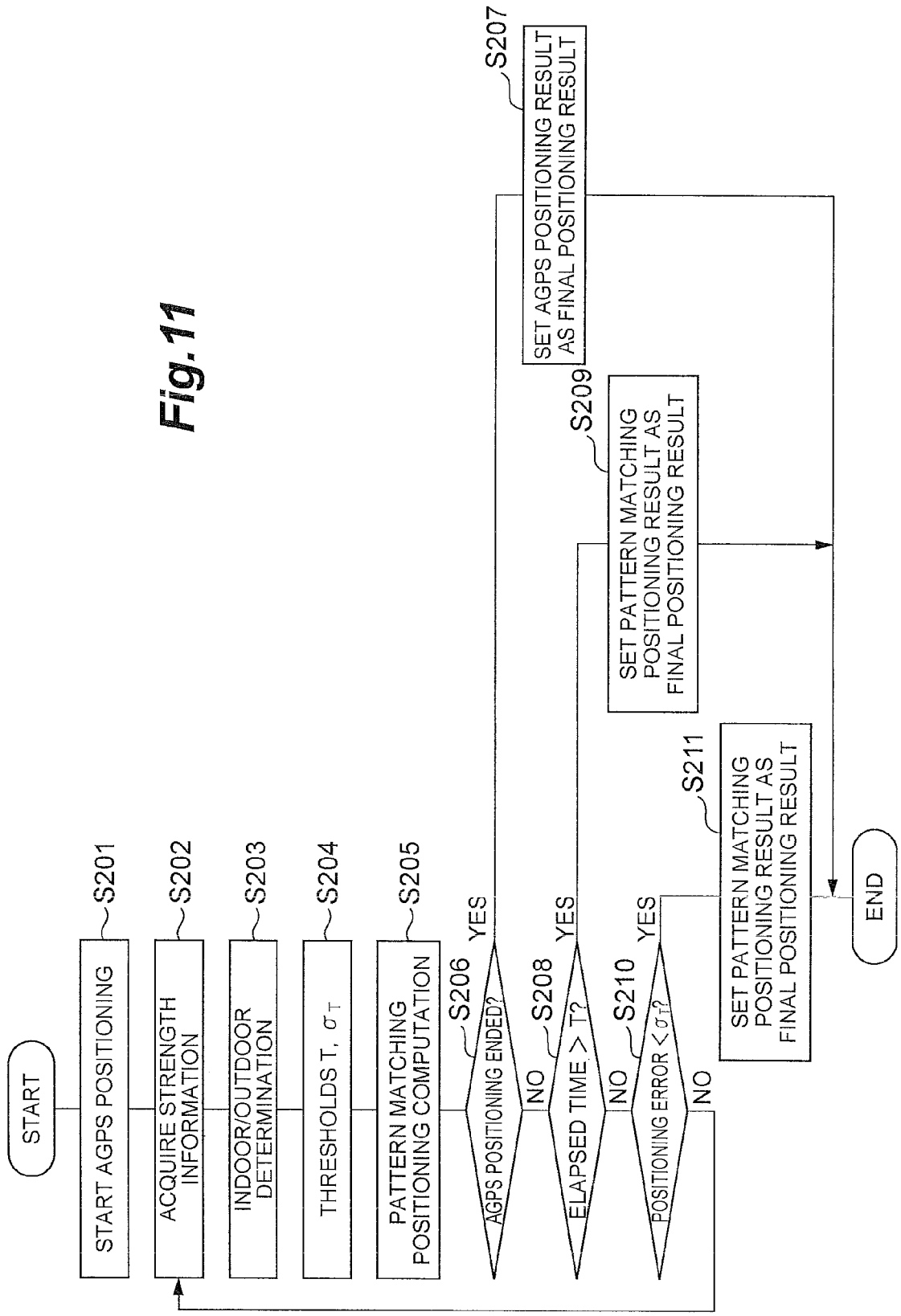
FIG. 11 is a flowchart illustrating positioning processing by a hybrid algorithm 1.

Next, the indoor/outdoor determination processing (indoor/outdoor determination method) executed by the indoor/outdoor determination component 124, 134 in this embodiment will be described through reference to the flowchart of FIG. 7. This processing is executed, for example, in an indoor/outdoor determination step (S203 in FIGS. 11 and 12, and S305 in FIG. 13) by the indoor/outdoor determination component 124, 134 in positioning processing (FIGS. 11 to 13) as discussed below.

First, at the indoor/outdoor determination component 124, 134, the reception component 52 receives from the cellular terminal 20 MR that includes information for identifying the emission source of the received signal (S21 in FIG. 7), and the specification component 53 counts the number of pieces of emission source identification information included in the received MR and thereby specifies the emission source number N of the received signal (S22). For example, if there are two pieces of emission source identification information included in the received MR, "BTS-A" and "BTS-B," the emission source number N is specified as "2." As to the emission source, received signals belonging to the same cell may be taken to be received signals from the same emission source, or received signals from different sectors belonging to the same cell may be taken to be received signals from different emission sources.

The possibility determination component 54 determines whether or not the emission source number N is equal to or greater than the minimum emission source number M at which indoor/outdoor determination is possible on the basis of a first indoor/outdoor determination method (S23).

In S23, if the emission source number N is equal to or greater than the minimum emission source number M, it can be decided that indoor/outdoor determination is possible on the basis of the first indoor/outdoor determination method, so the first indoor/outdoor determination component 55 executes indoor/outdoor determination on the basis of the first indoor/outdoor determination method (S24). To give an example of this, the approximate position of the cellular terminal 20 is calculated by referring to a positioning database (not shown) in which the MR from the cellular terminal 20 has been stored in advance, and a determination of indoors or outdoors is made on the basis of whether or not there is a contradiction between the measurement data in the MR and the predicted data in the approximate position. The extent P of being indoors is calculated from the magnitude of the contradiction between the measurement data M and the predicted data D in the approximate position. For instance, $P=(D-M)/M$, where a value less than zero is considered to be zero, and a value greater than 1 is considered to be 1.

On the other hand, in S23, if the emission source number N is less than the minimum emission source number M, it can be decided that indoor/outdoor determination is impossible on the basis of the first indoor/outdoor determination method, so the second indoor/outdoor determination component 56 executes indoor/outdoor determination on the basis of the following second indoor/outdoor determination method.

The second indoor/outdoor determination component 56 extracts from the determination database 51 combined information including all of the emission source identification information included in the MR, and GPS possibility information corresponding to this combined information, and sets the lowest number of emission sources included in the extracted combined information as the minimum emission source number Q (S25).

Figure 8:
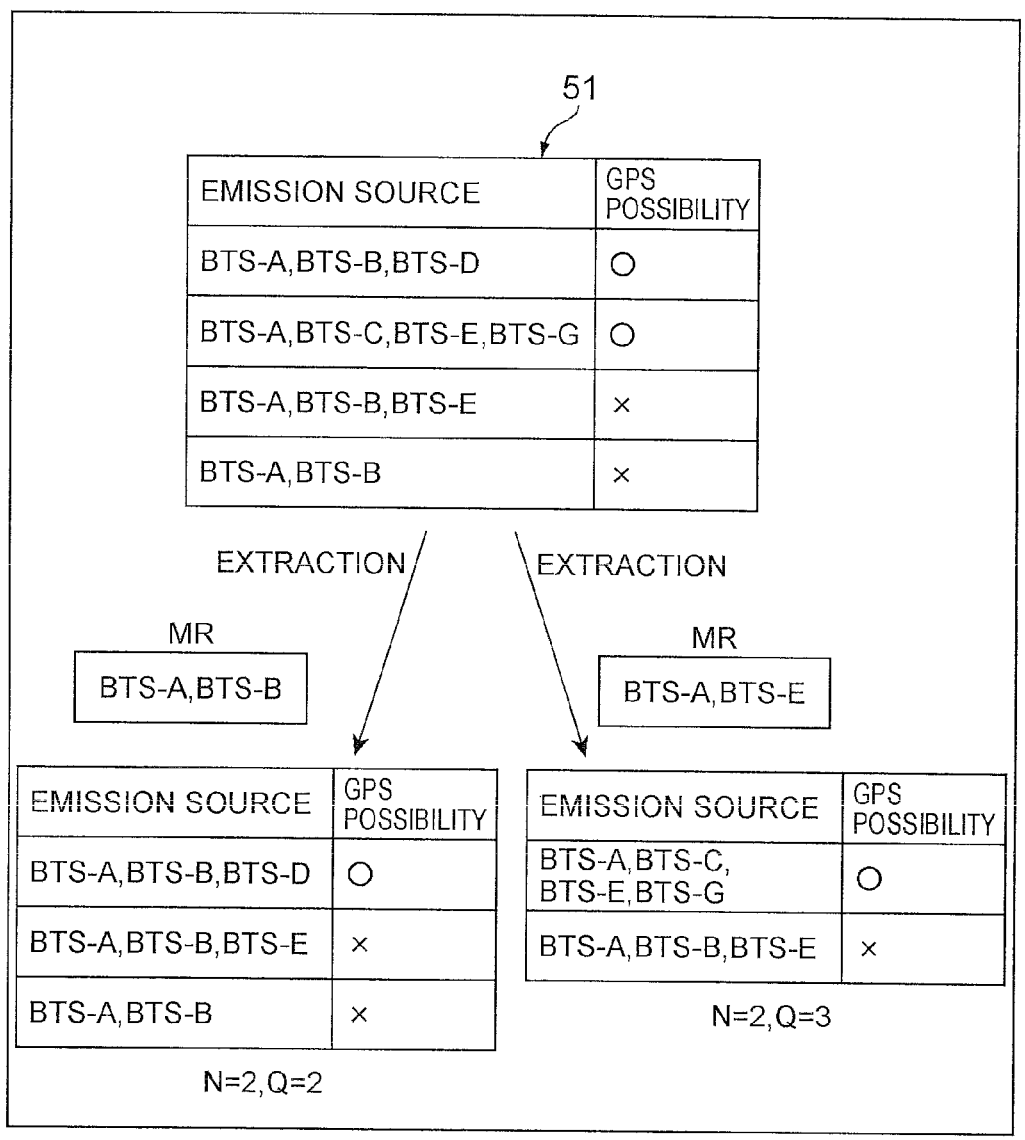
FIG. 8 is a diagram illustrating the processing in FIG. 7.

To give a specific example, as shown in FIG. 8, if the emission source identification information (BTS-A, BTS-B) is included in the MR, three combined information sets consisting of (BTS-A, BTS-B, BTS-D), (BTS-A, BTS-B, BTS-E), and (BTS-A, BTS-B), and GPS possibility information corresponding to these, are extracted from the determination database 51 as the combined information including all of this emission source identification information (BTS-A and BTS-B). The lowest value "2" out of the numbers of emission sources included in the above-mentioned three sets of combined information ("3," "3," and "2" here) is set as the minimum emission source number Q.

To give another example, if the emission source identification information (BTS-A, BTS-E) is included in the MR, two combined information sets consisting of (BTS-A, BTS-C, BTS-E, BTS-G) and (BTS-A, BTS-B, BTS-E), and GPS possibility information corresponding to these, are extracted from the determination database 51 as the combined information including all of this emission source identification information (BTS-A and BTS-E). The lowest value "3" out of the numbers of emission sources included in the above-mentioned two sets of combined information ("4" and "3" here) is set as the minimum emission source number Q.

Next, the second indoor/outdoor determination component 56 determines whether or not the emission source number N is equal to or greater than the minimum emission source number Q (S26). If the emission source number N is equal to or greater than the minimum emission source number Q in S26, it can be decided that the cellular terminal 20 has received a signal from at least the minimum emission source number Q of emission sources, so it is concluded that the cellular terminal 20 is outdoors. In view of this, it is checked to see if there is GPS possibility information corresponding to the same combined information as the combination of emission source identification information included in the MR (S27), and if there is GPS possibility information, indoors or outdoors is determined on the basis of this GPS possibility information (S29). If there is no GPS possibility information, it is determined that the cellular terminal 20 is outdoors (S28). If there is GPS possibility information, when a determination about indoors or outdoors is made on the basis of this GPS possibility information, the degree of matching to this GPS possibility information is used as the extent to which the cellular terminal 20 is indoors. If there is no GPS possibility information, the extent P to which the cellular terminal 20 is outdoors is calculated from the difference between N and Q. For example, $P=A(Q-N)/N$, where if P is over 1 it is treated as 1, and if under zero it is treated as zero. A is a coefficient, and is a system parameter.

On the other hand, if the emission source number N is less than the minimum emission source number M in S26, it is checked to see if there is GPS possibility information corresponding to the same combined information as the combination of emission source identification information included in the MR (S30), and if there is GPS possibility information, indoors or outdoors is determined on the basis of this GPS possibility information (S29). If there is no GPS possibility information, it is determined whether or not the emission source number N is less than the minimum emission source number P at which indoor/outdoor determination is possible on the basis of the second indoor/outdoor determination method (S31), and if the emission source number N is less than the minimum emission source number P, it is determined that indoor/outdoor determination is impossible on the basis of the second indoor/outdoor determination method (S33). On the other hand, if the emission source number N is equal to or greater than the minimum emission source number P, it is determined that indoor/outdoor determination is possible on the basis of the second indoor/outdoor determination method, but that the cellular terminal 20 is indoors since it can be decided that the cellular terminal 20 has not received a signal from at least the minimum emission source number M of emission sources, and the reception state is inferior (S32).

Figure 7:
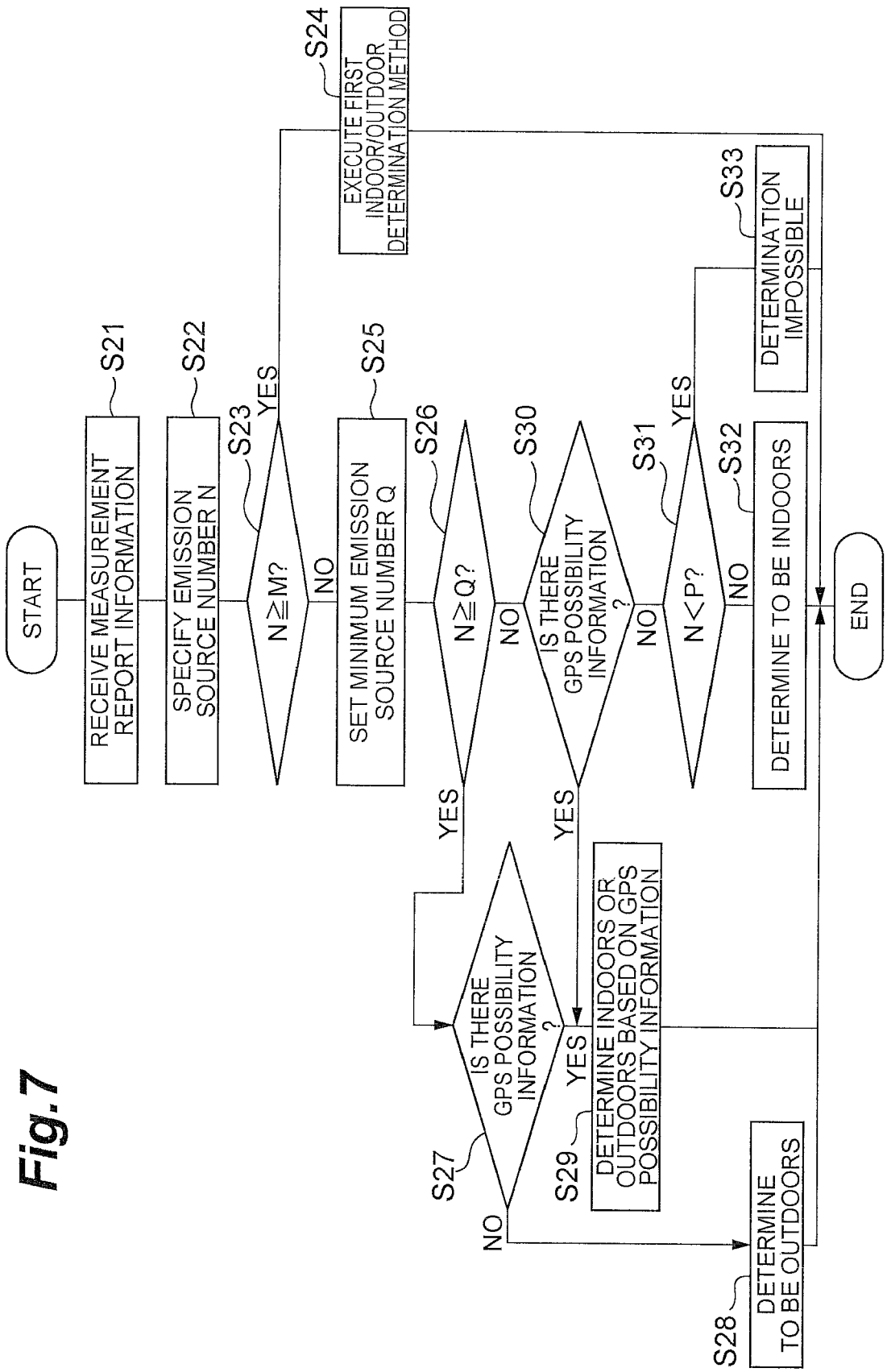
FIG. 7 is a flowchart of indoor/outdoor determination processing (indoor/outdoor determination method)

As discussed above, a determination result as to whether the cellular terminal 20 is indoors or outdoors, or whether it cannot be determined, can be quickly obtained by the indoor/outdoor determination processing in FIG. 7.

As discussed above, with the positioning server 10 pertaining to this embodiment, the execution of indoor/outdoor determination based on the first indoor/outdoor determination method is controlled on the basis of the result of comparing the emission source number N and the minimum emission source number M, and if the execution of indoor/outdoor determination based on the first indoor/outdoor determination method is impossible, it is possible to switch quickly to execution of indoor/outdoor determination based on the second indoor/outdoor determination method. Also, in indoor/outdoor determination based on the second indoor/outdoor determination method, if there is GPS possibility information, a determination of indoors or outdoors can be properly made on the basis of this GPS possibility information, and if there is no GPS possibility information, a determination of indoors or outdoors can be properly made on the basis of the emission source number N, the minimum emission source number Q, and the minimum number of emission sources P at which the second indoor/outdoor determination method is possible.

The determination database 51 can be configured as follows, for example. First, the determination database 51 can be configured by extracting the necessary information (GPS possibility information or information identifying the emission source of a received signal) from a positioning database (not shown) that stores information included in the MR (such as information identifying the emission source of a received signal, the received signal level, information indicating the signal transmission delay, information indicating the amount of attenuation, and information about whether GPS positioning is possible). The above-mentioned positioning database may also be utilized directly as a determination database.

Second, the determination database 51 can be configured using measurement information obtained in the course of configuring a positioning database and ordinary positioning. This second method can be divided into two types: a method that uses measurement data and a method that uses prediction data.

Figure 9:
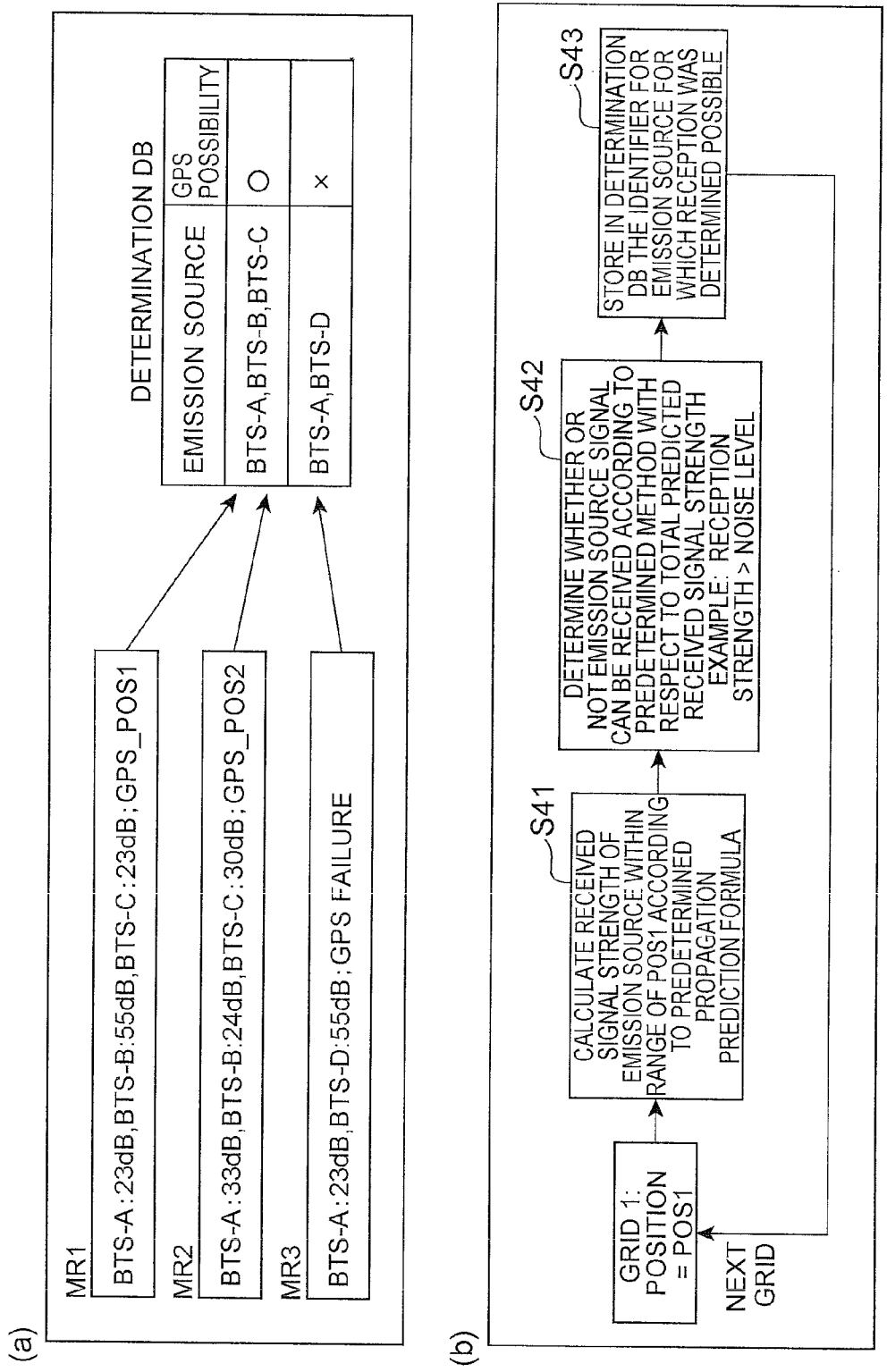
FIG. 9 is a diagram illustrating the construction of a determination database.

Of these, a method that uses measured data involves creating a database by linking the emission source identification information measured at the cellular terminal to whether or not GPS positioning is possible. For example, as shown in (a) of FIG. 9, MR1, MR2, and MR3 including measurement data are received, a database is created by linking a combination of emission source identification information from MR1 and MR2 (BTS-A, BTS-BBTS-C) to information that GPS positioning is possible, and a database is created by linking a combination of emission source identification information from MR3 (BTS-A, BTS-D) to information that GPS positioning is impossible, thereby configuring the determination database in (a) of FIG. 9.

Meanwhile, a method that uses prediction data involves assuming that the entire grid (the individual places resulting from dividing the measured area into a mesh pattern) is outdoors, producing prediction data from a propagation prediction formula that takes into account the landscape and surrounding obstructions for each grid, and creating a database. For example, as shown in (b) of FIG. 9, the received signal strength of all surrounding emission sources in a certain grid (position: POS1) is calculated by a predetermined propagation prediction formula (S41), and it is determined whether or not that emission source signal can be received, according to a predetermined method, with respect to the overall predicted received signal strength (S42). For example, a predetermined noise level is used as a reference, and if the reception strength is higher than this noise level, it is determined that the emission source signal can be received, but if the reception strength is equal to or less than this noise level, it is determined that the emission source signal cannot be received. The combination of identifiers for the emission sources for which reception was deemed possible is stored in the determination database (S43). Thereafter, steps S41 to S43 are executed for each grid to configure a determination database.

Next, the positioning processing (positioning method) executed by the positioning system 1 pertaining to this embodiment will be described through reference to the flowchart of FIGS. 10 to 13. First, the overall positioning processing executed by the positioning system 1 pertaining to this embodiment will be described through reference to the flowchart in FIG. 10. This processing is commenced when the positioning server 10 receives a request from the cellular terminal 20 for positioning via the cellular communication network. However, the positioning processing may instead be triggered by something else.

First, the cell ID of the cellular base station 30 that is the emission source of the received radio wave is measured by the cellular communication component 21 of the cellular terminal 20, and information about this cell ID is sent from the cellular communication component 21 to the positioning server 10. At the positioning server 10, the cell ID is received by the cell ID positioning component 16 via the transceiver 11 (S101, an emission source positioning step).

Next, the radius R of the cell pertaining to the cell ID is estimated by the cell ID positioning component 16 (S102, an emission source positioning step). The values of the estimated radius R and a previously stored threshold dr are then compared by the second base station positioning calculator 132 (S103, an emission source positioning step). If the estimated radius is below the threshold dr, it can be estimated that the cellular terminal 20 is located at the position of that cell (the position of the cellular base station 30), and that cell ID is used as the positioning result. If it is decided that the estimated radius is not below the threshold dr, then the positioning result is that the position cannot be estimated from the cell ID. The above-mentioned positioning result produced by the base station positioning calculator 13 is inputted to the end decision component 14.

Next, the cell ID positioning component 16 decides whether or not to end the estimation of the position of the cellular terminal 20 on the basis of the positioning result. If the positioning result is to the effect that positioning could be performed on the basis of the cell ID, it is decided that the estimation of the position of the cellular terminal 20 is to be ended, then the positioning result produced by cell ID is used as the final positioning result, and the positioning processing is ended (S104, an emission source positioning step).

On the other hand, if the positioning result is to the effect that positioning cannot be performed on the basis of cell ID, the cell ID positioning component 16 decides not to end the estimation of the position of the cellular terminal 20. In that case, a signal that starts processing for pattern matching positioning is sent through the transceiver 11 to the cellular terminal 20 (S45). If the elapsed time of the positioning is used for the decision, the positioning elapsed time is counted from this point in the positioning server 10. In this case, positioning by the hybrid algorithm 1 or the hybrid algorithm 2 is then carried as follows.

With the positioning server 10, requirement information indicating a requirement with respect to the estimation of the position of the cellular terminal 20 is inputted to the requirement information input component 14 (S105, requirement information input step). More specifically, for example, the requirement information input component 14 requests that the cellular terminal 20 transmit requirement information, and the requirement information accordingly transmitted from the cellular terminal 20 is received by the requirement information input component 14. The requirement information is outputted from the requirement information input component 14 to the positioning method determination component 15.

Then, whether to execute the hybrid algorithm 1 or the hybrid algorithm 2 is determined by the positioning method determination component 15 on the basis of the requirement information inputted from the requirement information input component 14 (S106, positioning method determination step). The determination of the positioning method is carried out by referring to the information in the table of FIG. 3 as discussed above.

If the above determination is that the hybrid algorithm 1 is to be executed, the execution of positioning by the first positioning component 12 is controlled by the positioning method determination component 15, and positioning by the hybrid algorithm 1 is performed by the first positioning component 12 (S107, positioning method determination step, first positioning step).

On the other hand, if it is determined that the hybrid algorithm 2 is to be executed, the execution of positioning by the second positioning component 13 is controlled by the positioning method determination component 15, and positioning by the hybrid algorithm 2 is performed by the second positioning component 13 (S108, positioning method determination step, second positioning step). The above is the overall positioning processing executed by the positioning system 1 pertaining to this embodiment.

Positioning processing by the hybrid algorithm 1 and by the hybrid algorithm 2 will now be described. First, positioning processing by the hybrid algorithm 1 (S107) will be described through reference to the flowchart in FIG. 12.

First, a signal that starts processing for pattern matching positioning and GPS positioning is sent from the first positioning component 12 through the transceiver 11 to the cellular terminal 20 (S201, the first position estimation step). The positioning elapsed time is counted from this point in the positioning server 10.

At the cellular terminal 20, this signal is received, which triggers the reception of a signal from the GPS satellite 40 by the GPS reception component 22 and the start of GPS positioning computation (AGPS positioning) by the GPS positioning computer 23 (S201, the position estimation step). At the cellular terminal 20, if the AGPS positioning by the GPS reception component 22 and the GPS positioning computer 23 has succeeded (that is, if a positioning result of a specific precision has been obtained) or failed, information about the positioning result is sent to the positioning server 10. At the positioning server 10, the information about the positioning result produced by AGPS positioning is received by the first end decision component 123 of the first positioning component 12 through the transceiver 11.

With the cellular terminal 20, this signal is received, reception state information indicating the reception state of the radio wave is measured by the cellular communication component 21, and this information is sent as MR to the positioning server 10. The reception state information continues to be measured (such as at regular intervals) at the cellular terminal 20 even after the MR transmission, and this information is sent as MR to the positioning server 10. Then, at the positioning server 10, the MR is received by the first reception state information acquisition component 121 via the transceiver 11 (S202, a reception state information acquisition step). The MR received by the first reception state information acquisition component 121 is outputted to the indoor/outdoor determination component 124 and the first base station positioning calculator 122.

Then, the indoor/outdoor determination component 124 determines whether or not the cellular terminal 20 is indoors or outdoors on the basis of the MR inputted from the reception state information acquisition component 12 (S203, an indoor/outdoor determination step). The result of determination by the indoor/outdoor determination component 124 is outputted to the first end condition determination component 125. Then, the first end condition determination component 125 determines the specific end condition used in the decision by the first end decision component 123 on the basis of the result of determination by the indoor/outdoor determination component 124. More specifically, the pattern matching positioning error threshold $\sigma_T$ and the positioning elapsed time threshold T are determined (S204, a first end condition determination step). Information indicating the determined specific end condition is outputted to the first end decision component 123.

Then, pattern matching positioning computation is performed by the first base station positioning calculator 122 on the basis of the MR inputted from the first reception state information acquisition component 121, the position of the cellular terminal 20 is estimated, and the positioning error is calculated (S205, a first position estimation step). The positioning result and positioning error produced by pattern matching positioning are outputted from the first base station positioning calculator 122 to the first end decision component 123.

Then, the first end decision component 123 decides whether or not AGPS positioning has ended (S206, a first end decision step). This decision is made according to whether the positioning result produced by AGPS positioning from the cellular terminal 20 (one in which positioning of a specific precision has succeeded) is inputted to the first end decision component 123. If it is decided that the AGPS positioning has ended, the first end decision component 123 decides to end the estimation of the position of the cellular terminal 20. In that case, the positioning result produced by AGPS positioning is used as the final positioning result, and the positioning processing is ended (S207).

If it is decided that the AGPS positioning has not ended, then the first end decision component 123 decides whether or not the positioning elapsed time is above the threshold T (S208, a first end decision step). If it is decided that the positioning elapsed time is above the threshold T, the first end decision component 123 decides to end the estimation of the position of the cellular terminal 20. In that case, the positioning result produced by pattern matching positioning (the new result obtained in S205) is used as the final positioning result, and positioning processing is ended (S209).

If it is decided that the positioning elapsed time is not above the threshold T, the first end decision component 123 decides whether or not the positioning error of the positioning result produced by pattern matching positioning (the new result obtained in S205) is below the threshold $\sigma_T$ (S210, a first end decision step). If it is decided that the positioning error is below the threshold $\sigma_T$, the end decision component 123 decides to end the estimation of the position of the cellular terminal 20. In that case, the positioning result produced by pattern matching positioning (the new result obtained in S205) is used as the final positioning result, and positioning processing is ended (S211).

If it is decided that the positioning error is not below the threshold $\sigma_T$, MR is again received by the first reception state information acquisition component 121 via the transceiver 11 according to transmission from the cellular terminal 20 (S202), and the same processing as above is repeated.

If the first end decision component 123 decides to end the estimation of the position of the cellular terminal 20 as described above (S207, S209, S211), a signal that halts processing for positioning is sent from the first end decision component 123 through the transceiver 11 to the cellular terminal 20. When this signal is received at the cellular terminal 20, processing for positioning is halted. Further, the information indicating the final positioning result (information indicating the estimated position of the cellular terminal 20) is outputted corresponding to the usage details, such as sending it to the cellular terminal 20.

The order of the processing of the decision about ending positioning in S208 and S210 above may be reversed. That is, the decision (S208) as to whether or not the positioning error of the positioning result produced by pattern matching positioning (S210) is below the threshold $\sigma_T$ may be made before the decision as to whether or not the positioning elapsed time is above the threshold T.

Next, another example of the positioning processing will be described through reference to the flowchart of FIG. 12. In the processing described through reference to the flowchart of FIG. 11 in the decision about ending positioning (S206, S208, S210), if it was decided not to end positioning, MR was acquired again (S202), indoor/outdoor determination was performed (S203), and the threshold $\sigma_T$ for positioning error of pattern matching and the threshold T for positioning elapsed time were determined (S204) on the basis of this. However, the indoor/outdoor determination (S203) and the determination of the threshold $\sigma_T$ for positioning error of pattern matching and the threshold T for positioning elapsed time (S204) do not necessarily have to be performed for every repetition, and may only be performed once.

Figure 12:
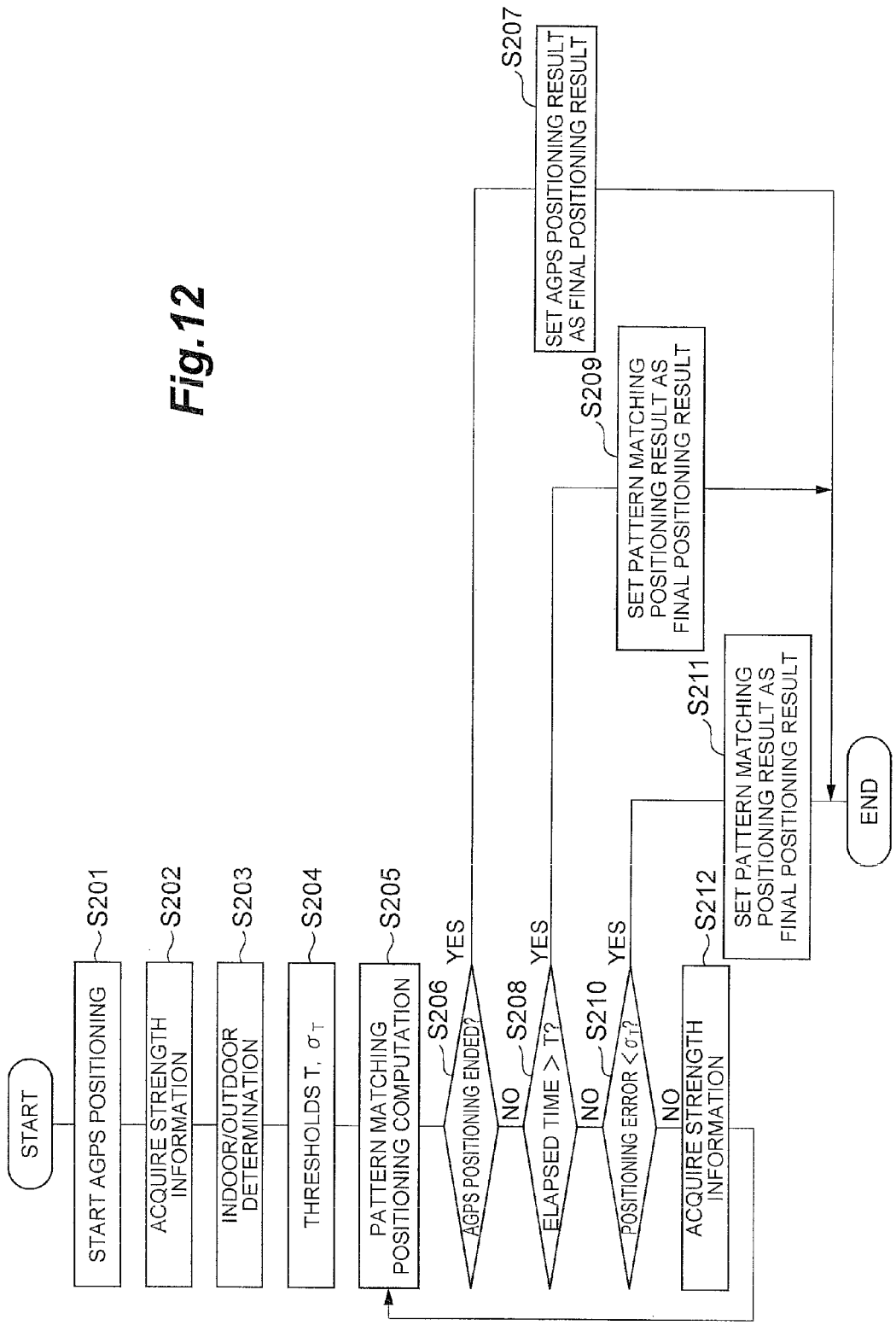
FIG. 12 is a flowchart illustrating positioning processing by the hybrid algorithm 1.
Figure 13:
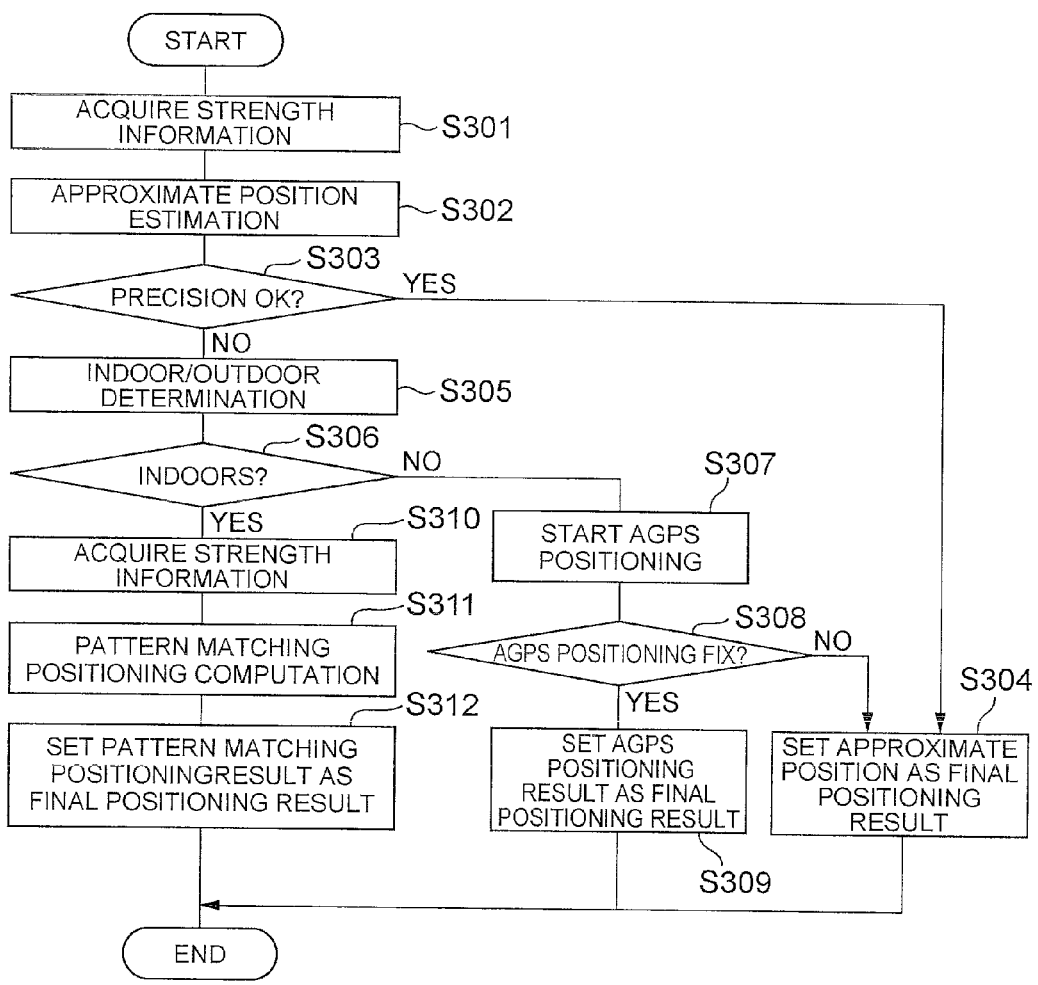
FIG. 13 is a flowchart illustrating positioning processing by a hybrid algorithm 2.

Specifically, as shown in the flowchart of FIG. 12, in the decision about ending positioning (S206, S208, S210), if it is decided not to end positioning, MR is again received by the reception state information acquisition component 121 via the transceiver 11 according to transmission from the cellular terminal 20 (S212, a first reception state information acquisition step). The MR received by the first reception state information acquisition component 121 is outputted to the base station positioning calculator 122.

Then, pattern matching positioning computation is performed by the first base station positioning calculator 122 on the MR inputted from the first reception state information acquisition component 121, the position of the cellular terminal 20 is estimated, and the positioning error is calculated (S205, a first position estimation step). Subsequent processing is similar to the processing shown in the flowchart in FIG. 11.

If the indoor/outdoor determination is not to be put in a repeating loop as above, the calculated amount can be reduced. In this case, however, it is possible that the positioning performance will be lower than with the processing shown in the flowchart of FIG. 11. The above is the positioning processing by the hybrid algorithm 1.

The positioning processing by the hybrid algorithm 2 (S108) will now be described through reference to the flowchart in FIG. 14.

First, a signal that starts processing for pattern matching positioning is sent from the second positioning component 13 through the transceiver 11 to the cellular terminal 20 (S301). If the elapsed time of the positioning is used for the decision, the positioning elapsed time is counted from this point in the positioning server 10.

With the cellular terminal 20, this signal is received, reception state information indicating the reception state of the radio wave is measured by the cellular communication component 21, and this information is sent as MR to the positioning server 10. The reception state information continues to be measured (such as at regular intervals) at the cellular terminal 20 even after the MR transmission, and this information is sent as MR to the positioning server 10. Then, at the positioning server 10, the MR is received by the second reception state information acquisition component 131 via the transceiver 11 (S301, a second reception state information acquisition step). The MR received by the second reception state information acquisition component 131 is outputted to the indoor/outdoor determination component 134 and the second base station positioning calculator 132.

Then, pattern matching positioning computation is performed by the second base station positioning calculator 132 on the basis of the MR inputted from the second reception state information acquisition component 131, the approximate position of the cellular terminal 20 is estimated, and the positioning error is calculated (S302, a second approximate position estimation step). The positioning result and positioning error produced by pattern matching positioning are outputted from the second base station positioning calculator 132 to the second end decision component 133.

Next, the second end decision component 133 decides whether or not the positioning error is less than a threshold (S303, a second end decision step). If it is decided that the positioning error is below the threshold, the second end decision component 133 decides to end the estimation of the position of the cellular terminal 20. In that case, the approximate position is used as the final positioning result, and the positioning processing is ended (S304). If the second end decision component 133 decides to end the estimation of the position of the cellular terminal 20, a signal that halts processing for positioning is sent from the second end decision component 133 through the transceiver 11 to the cellular terminal 20. When this signal is received by the cellular terminal 20, processing for positioning is halted.

If it is decided that the positioning error is not below the threshold, a notification to this effect is sent from the second end decision component 133 to the indoor/outdoor determination component 134. Then, the indoor/outdoor determination component 134 determines whether the cellular terminal 20 is indoors or outdoors on the basis of the MR inputted from the second reception state information acquisition component 131 (S305, a second indoor/outdoor determination step).

The result of determination by the indoor/outdoor determination component 134 is outputted to the positioning controller 135.

Next, the second positioning controller 135 controls the positioning method of the cellular terminal 20 on the basis of the result of determination by the indoor/outdoor determination component 134 (S306, a second positioning control step). If the result of determination by the indoor/outdoor determination component 134 is that the cellular terminal 20 is located outdoors, then the second positioning controller 135 performs control so that the GPS positioning of the cellular terminal 20 is executed (S307, a second positioning control step). More specifically, the second positioning controller 135 sends a control signal that executes GPS positioning on the cellular terminal 20.

At the cellular terminal 20, this signal is received, which triggers the reception of a signal from the GPS satellite 40 by the GPS reception component 22 and the start of GPS positioning computation (AGPS positioning) by the GPS positioning computer 23 (S307, the second positioning control step). At the cellular terminal 20, if the AGPS positioning by the GPS reception component 22 and the GPS positioning computer 23 has succeeded (that is, if a positioning result of a specific precision has been obtained) or failed, information about the positioning result is sent to the positioning server 10. At the positioning server 10, the information about the positioning result produced by AGPS positioning is received by the second end decision component 133 through the transceiver 11.

At the positioning server 10, the second end decision component 133 decides whether or not the AGPS positioning has succeeded (that is, whether or not the AGPS positioning is fixed) (S53). This decision is made according to whether the positioning result produced by AGPS positioning from the cellular terminal 20 (one in which position of a specific precision has succeeded) is inputted to the second end decision component 133. If it is decided that the AGPS positioning has succeeded, the positioning result produced by AGPS positioning is used as the final positioning result, and the positioning processing is ended (S309). If it is decided that the AGPS positioning has not succeeded, the approximate position is used as the final positioning result, and positioning processing is ended (S304).

On the other hand, if the result of determination by the indoor/outdoor determination component 134 in S306 is that the cellular terminal 20 is located indoors, the second positioning controller 135 performs control so that pattern matching positioning of the cellular terminal 20 is executed. More specifically, after S301, reception state information is measured at the cellular terminal 20, and this information is sent as MR to the positioning server 10. Then, at the positioning server 10, the MR is received by the second reception state information acquisition component 131 via the transceiver 11 (S310, a second positioning control step). The MR received by the second reception state information acquisition component 131 is outputted to the second base station positioning calculator 132.

Then, pattern matching positioning computation is performed by the second base station positioning calculator 132 on the new MR inputted from the second reception state information acquisition component 131, the position of the cellular terminal 20 is estimated, and the positioning error is calculated (S311, a second positioning control step). The positioning result and positioning error produced by pattern matching positioning are outputted from the second base station positioning calculator 132 to the second end decision component 133. When the positioning result from the second base station positioning calculator 132 is inputted to the second end decision component 133, it is decided to end the estimation of the position of the cellular terminal 20. In this case, the second end decision component 133 uses the positioning result of pattern matching positioning as the position of the cellular terminal 20 (S312). Alternatively, a decision may be made by the second end decision component 133 as follows. It is decided whether or not the positioning error of the positioning result obtained by pattern matching positioning computation performed by the second base station positioning calculator 132 is below a threshold $\sigma_T$, and it is decided whether or not to end the estimation of the position of the cellular terminal 20.

If it is decided by the second end decision component 133 that the positioning error is below the threshold $\sigma_T$, it is decided to end the estimation of the position of the cellular terminal 20. This means that positioning is ended when the positioning result obtained by the pattern matching positioning computation performed by the second base station positioning calculator 132 satisfies a specific measurement precision. In this case, the second end decision component 133 uses the positioning result of pattern matching positioning as the position of the cellular terminal 20 (S312).

If it is decided that the positioning error is not below the threshold $\sigma_T$, the second end decision component 133 decides whether or not the positioning elapsed time is above the threshold T, and decides whether or not to end the estimation of the position of the cellular terminal 20. If the second end decision component 133 decides that the positioning elapsed time is above the threshold T, it is decided to end the estimation of the position of the cellular terminal 20. In this case, the end decision component 133 uses the positioning result of pattern matching positioning as the position of the cellular terminal 20 (S312).

If the second end decision component 133 decides to end the estimation of the position of the cellular terminal 20, a signal that halts processing for positioning is sent from the second end decision component 133 through the transceiver 11 to the cellular terminal 20. When this signal is received at the cellular terminal 20, processing for positioning (MR measurement and transmission) is ended.

If it is decided that the positioning error is not below the threshold $\sigma_T$, and it is decided that the positioning elapsed time is not above the threshold T, then MR is again received by the second reception state information acquisition component 131 through the transceiver 11 according to the transmission from the cellular terminal 20, pattern matching positioning computation is performed by the second base station positioning calculator 132 (S310, S311), and the same processing as above is repeated (repeated processing is not depicted).

The information indicating the final positioning result (information indicating the estimated position of the cellular terminal 20) obtained as above (S304, S309, S312) is outputted corresponding to the usage details, such as sending it to the cellular terminal 20. The above-described is positioning processing by the hybrid algorithm 1.

As discussed above, in this embodiment a positioning method corresponding to requirement information is decided and executed from among two positioning methods each having a different positioning time and positioning precision. As discussed above, with this embodiment, it is decided whether the cellular terminal 20 is indoors or outdoors on the basis of MR measured by the cellular terminal 20, and a positioning end condition is determined on the basis of this decision. For example, in a suburban setting, the AGPS precision outdoors must be taken into account and $\sigma_T$ reduced, but indoors there will be problems at the same $\sigma_T$. The result of pattern matching positioning in the suburbs is far inferior to that with AGPS because there are fewer cellular base stations 30 (radio wave emission sources). Therefore, if a $\sigma_T$ that is close to the precision of AGPS is used, pattern matching positioning will not be fixed in most places, and positioning processing will end up being continued until there is a time-out. Conversely, if $\sigma_T$ is increased, there will be no positioning result by AGPS positioning outdoors, and the result of pattern matching positioning will be low in precision. As a result, the overall positioning precision might be significantly deteriorated.

As discussed above, the end condition for positioning can be selected according to the situation, that is, if it is believed that the cellular terminal 20 is outdoors and higher positioning precision will be obtained by taking a relatively long time for positioning, or if it is believed that the receiver is indoors and higher positioning precision will not be obtained even if a relatively long time is taken for positioning. Thus, with this embodiment, positioning can be performed at the proper positioning precision and in the proper positioning time according to whether the receiver is indoors or outdoors.

With the other hybrid algorithm 2, the approximate position of the cellular terminal 20 is estimated and the precision of this approximate position is calculated on the basis of MR measured by the cellular terminal 20. It is decided whether or not to end the estimation of the position of the receiver on the basis of the precision of this approximate position. Therefore, as long as the precision of the approximate position is sufficiently high, GPS positioning is not performed at this point, and the estimation of the position of the cellular terminal 20 is ended. Meanwhile, with the positioning system 1 pertaining to this embodiment, it is determined whether the cellular terminal 20 is indoors or outdoors on the basis of MR measured by the cellular terminal 20. The execution of GPS positioning is controlled on the basis of the decision as to whether or not to end the estimation of the position of the cellular terminal 20, and the determination as to whether the cellular terminal 20 is indoors or outdoors.

Therefore, if the cellular terminal 20 has adequate precision of the approximate position without GPS positioning being performed, or if it is in a state in which GPS positioning is difficult to perform, it does not execute GPS positioning, but otherwise it can perform control that executes GPS positioning, etc. Also, as discussed above, with the positioning system 1, control about whether or not GPS positioning can be executed can be performed without actually performing GPS positioning, which takes a long time to decide whether or not it can be performed. Specifically, with the positioning system 1 pertaining to this embodiment, a positioning result that corresponds to the state of the receiver can be obtained in less time.

As above, with the hybrid algorithm 1, the threshold $\sigma_T$ and the threshold T are determined on the basis of indoor/outdoor determination, so the positioning precision and positioning time can be optimized. On the other hand, since the function of GPS positioning operates constantly every time positioning is performed by the cellular terminal 20, the cellular terminal 20 consumes more power (more battery consumption). The hybrid algorithm 2 switches between GPS positioning and pattern matching positioning, so the positioning time and positioning precision cannot be optimized, but since the function of GPS positioning operates only when needed, the cellular terminal 20 consumes less power than with the hybrid algorithm 1. Also, if an approximated position has sufficient precision, the positioning processing is shut down at that point, so the positioning time is shorter. With this embodiment, either the hybrid algorithm 1 or the hybrid algorithm 2 is selected according to the requirement with respect to positioning, so positioning can be performed at the proper positioning time and positioning precision according to the application type and settings Also, it is preferable for the positioning based on MR to be pattern matching positioning as in this embodiment. With this constitution, the position of the cellular terminal 20 can be estimated reliably and properly on the basis of MR. However, the positioning method based on MR does not necessarily have to entail pattern matching, and instead, for example, the distance between the various cellular base stations 30 and the cellular terminal 20 may be found on the basis of RTT, and the position of the cellular terminal 20 estimated on this basis.

Also, as in this embodiment, it is preferable if the end condition determined by the first end condition determination component 125 is the threshold $\sigma_T$ of positioning result error and/or the threshold T of the elapsed time of positioning. With this constitution, the positioning end condition can be determined reliably and properly. However, another end condition besides this may be used instead.

Also, it is preferable for positioning based on cell ID to be performed at the beginning of the overall positioning processing as in this embodiment. With this constitution, for example, if the cellular terminal 20 is in a place where the cellular base station 30 are located close together, or another such environment, the positioning result can be acquired easily. Positioning based on cell ID does not necessarily have to be performed, however.

Also, if, in the hybrid algorithm 2, pattern matching positioning is performed when the cellular terminal 20 is located indoors and GPS positioning is not to be performed, as in this embodiment, then the positioning result of the cellular terminal 20 can be obtained even though GPS positioning is not performed.

In this embodiment, request information input, positioning method determination, pattern matching positioning computation, indoor/outdoor determination, end condition determination, positioning method control, decision to end the positioning processing, and so forth were performed by the positioning server 10, but all of these may instead be performed at the cellular terminal 20. Specifically, the positioning system 1 may be the cellular terminal 20 itself. Conversely, the positioning system 1 may be the positioning server 10 itself. In that case, the positioning server 10 receives all information for performing positioning computation from the cellular terminal 20. For example, AGPS positioning computation may be performed by the positioning server 10.

The two modification examples given below may be employed as embodiments of the indoor/outdoor determination component 124, 134. In the first modification example, the determination database 51 does not store indoor/outdoor characteristic information (GPS possibility information in the above embodiment), and indoor/outdoor determination based on indoor/outdoor characteristic information is not performed. In the second modification example, indoor/outdoor determination based on indoor/outdoor characteristic information is not performed, nor is indoor/outdoor determination based on the first indoor/outdoor determination method. These modification examples will now described in order.

First Modification Example

Figure 14:
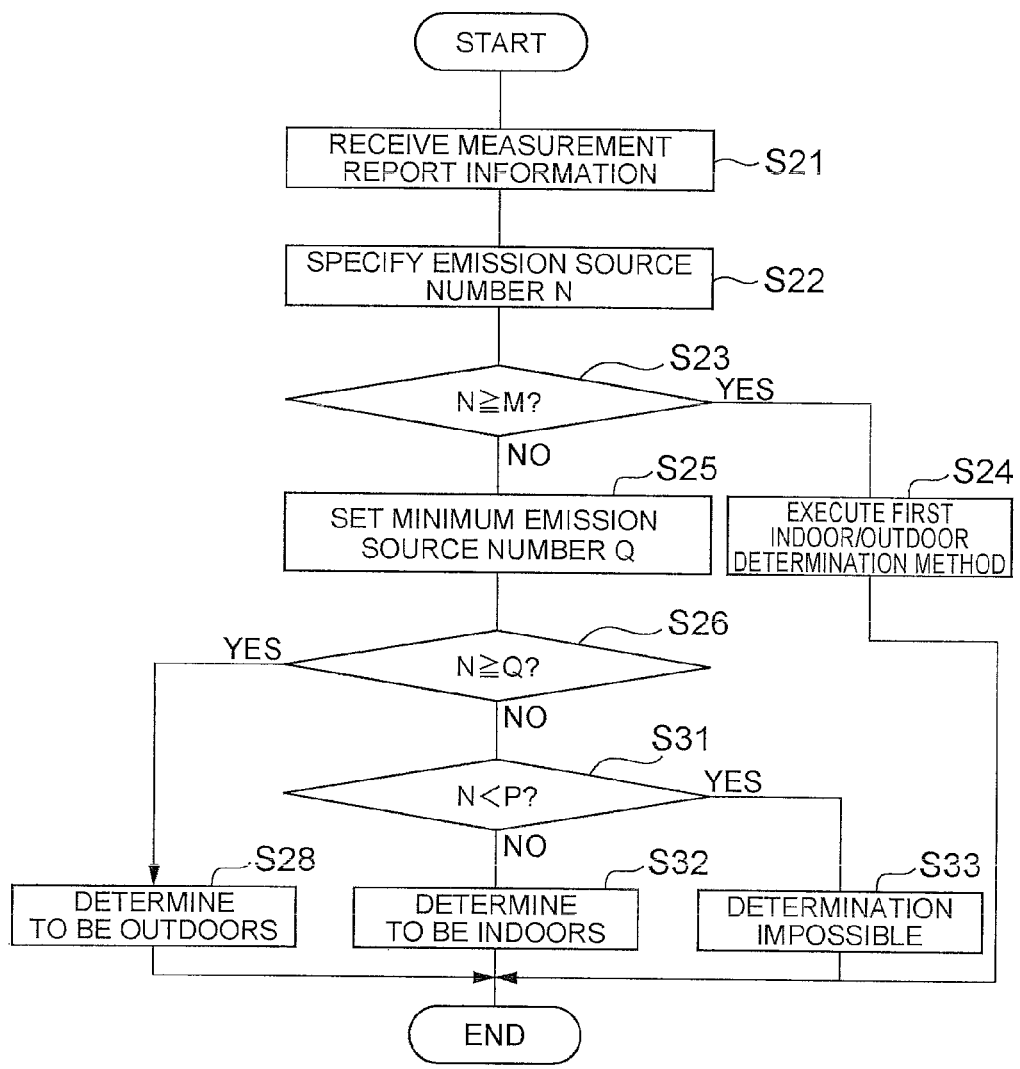
FIG. 14 is a flowchart illustrating a first modification example of an indoor/outdoor determination processing (indoor/outdoor determination method)

The functional configuration of the indoor/outdoor determination component 124, 134 in the first modification example is the same as the functional configuration shown in FIG. 4 and discussed above, but the indoor/outdoor determination processing (indoor/outdoor determination method) is expressed by the flowchart in FIG. 14. Specifically, in the indoor/outdoor determination processing in the first modification example, first the reception component 52 of the indoor/outdoor determination component 124, 134 receives from the cellular terminal 20 MR including emission source identification information about the received signal (S21 in FIG. 14), and the specification component 53 counts the number of pieces of emission source identification information included in the received MR, and thereby specifies the emission source number N of the received signal (S22). Next, the possibility determination component 54 determines whether or not the emission source number N is equal to or greater than the minimum emission source number M at which indoor/outdoor determination based on the first indoor/outdoor determination method is possible (S23).

In S23, if the emission source number N is equal to or greater than the minimum emission source number M, it can be decided that indoor/outdoor determination based on the first indoor/outdoor determination method is possible, so the first indoor/outdoor determination component 55 executes indoor/outdoor determination on the basis of the first indoor/outdoor determination method (S24).

Meanwhile, in S23, if the emission source number N is less than the minimum emission source number M, it can be decided that indoor/outdoor determination based on the first indoor/outdoor determination method is impossible, and the second indoor/outdoor determination component 56 executes indoor/outdoor determination based on the second indoor/outdoor determination method as follows. The second indoor/outdoor determination component 56 extracts from the determination database 51 combined information including all of the emission source identification information included in the MR, and sets the lowest value of the number of emission sources included in the extracted combined information as the minimum emission source number Q (S25).

Then, the second indoor/outdoor determination component 56 determines whether or not the emission source number N is equal to or greater than the minimum emission source number Q (S26). In S26, if the emission source number N is equal to or greater than the minimum emission source number M, it can be decided that the cellular terminal 20 has received signals from at least the minimum emission source number M of emission sources, so it is determined that the cellular terminal 20 is outdoors (S28).

On the other hand, if in S26 the emission source number N is less than the minimum emission source number M, it is determined whether or not the emission source number N is less than the minimum emission source number P at which indoor/outdoor determination based on the second indoor/outdoor determination method is possible (S31), and if the emission source number N is less than the minimum emission source number P, it is determined that indoor/outdoor determination based on the second indoor/outdoor determination method is impossible (S33). On the other hand, if the emission source number N is equal to or greater than the minimum emission source number P in S31, it can be decided that indoor/outdoor determination based on the second indoor/outdoor determination method is possible, but the cellular terminal 20 has not received signals from at least the minimum emission source number M of emission sources, and the reception state is poor, so it is determined that the cellular terminal 20 is indoors (S32).

Figure 10:
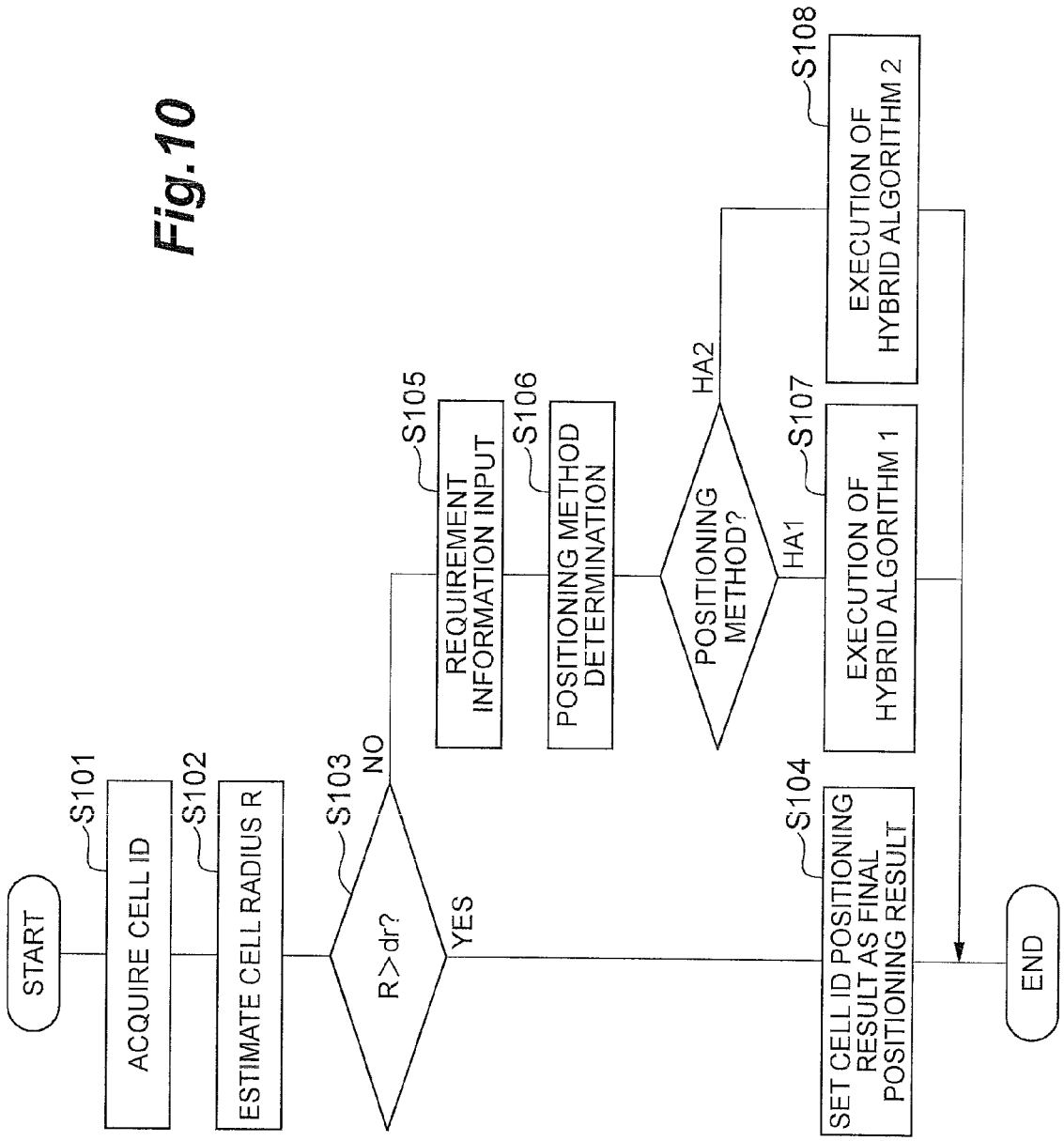
FIG. 10 is a flowchart illustrating the processing (positioning method) executed by a cellular terminal (receiver) and a positioning server constituting the positioning system pertaining to an embodiment of the present invention.

As discussed above, a determination result as to whether the cellular terminal 20 is indoors or outdoors, or whether it cannot be determined, can be quickly obtained by the indoor/outdoor determination processing in FIG. 10.

Second Modification Example

Figure 15:
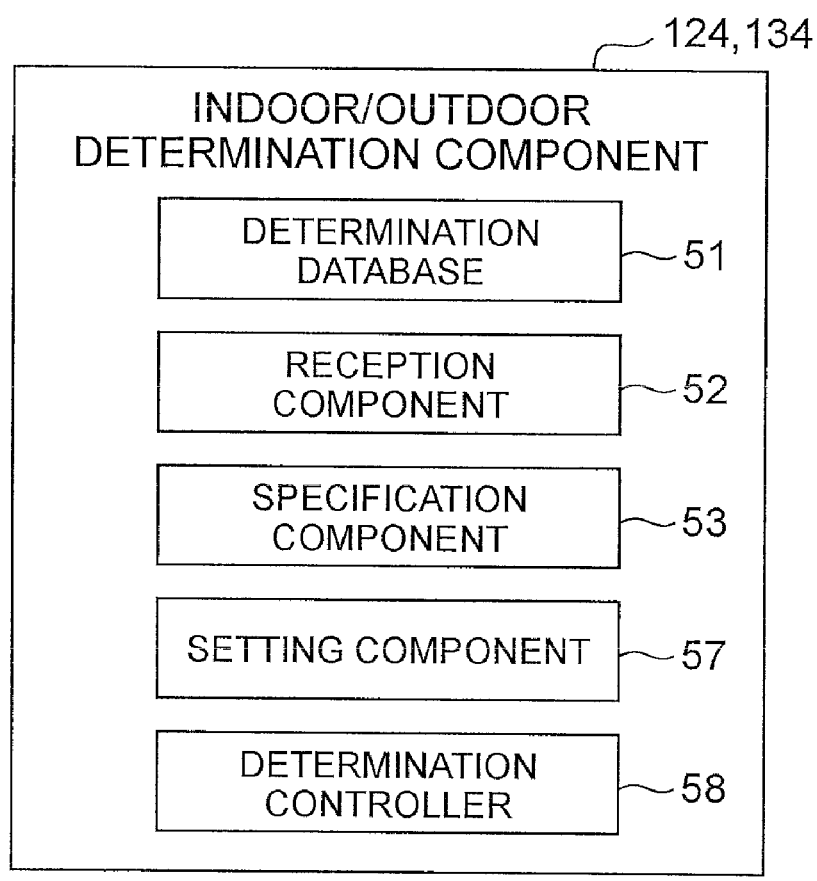
FIG. 15 is a diagram illustrating the functional configuration of a second modification example of an indoor/outdoor determination component.

As shown in FIG. 15, the indoor/outdoor determination component 124, 134 in the second modification example comprises the same determination database 51, reception component 52, and specification component 53 as in the above embodiment, as well as a setting component 57 and a determination controller 58. Of these, the setting component 57 extracts from the determination database 51 combined information including all of the emission source identification information included in the MR, and sets the lowest value of the number of emission sources included in the extracted combined information as the minimum emission source number Q. The determination controller 58 performs indoor/outdoor determination by the procedure discussed below, on the basis of the emission source number N, the minimum emission source number Q, and the minimum emission source number P at which indoor/outdoor determination is possible.

Figure 16:
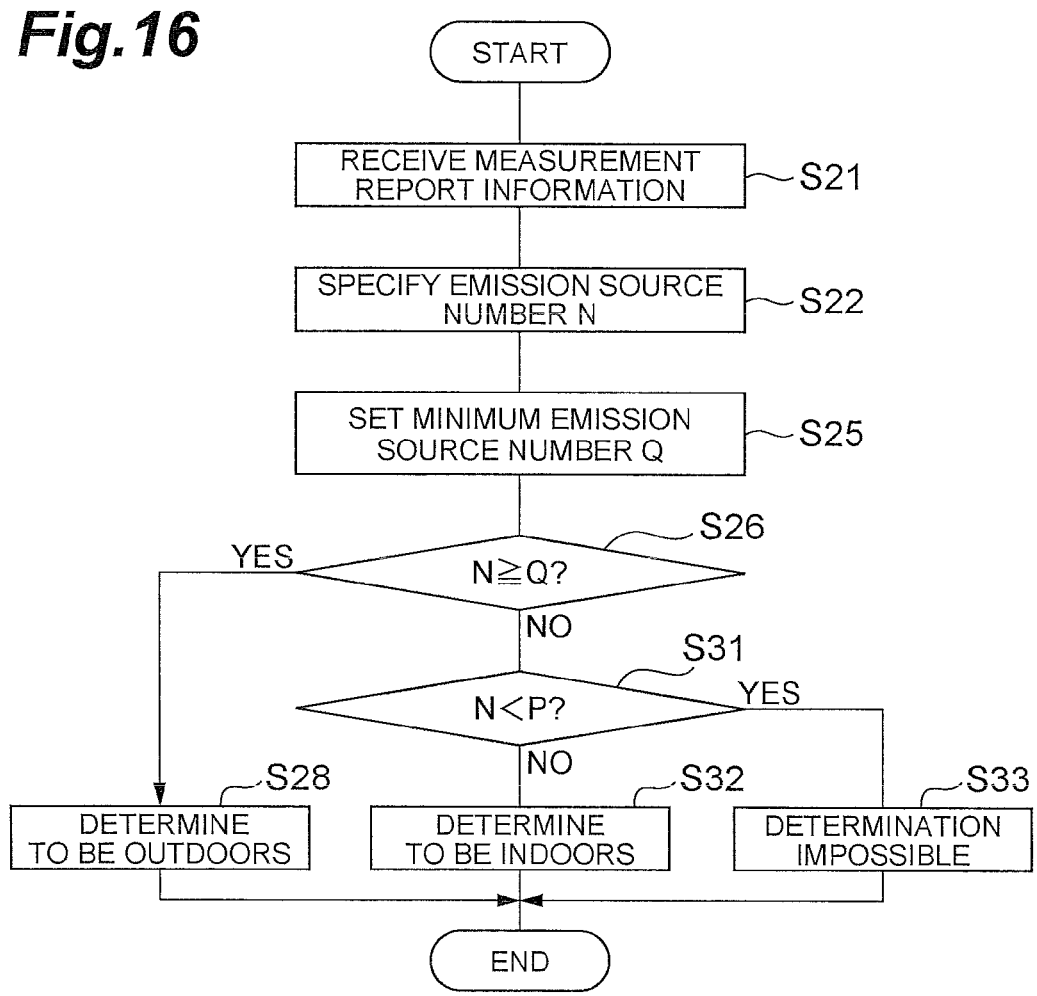
FIG. 16 is a flowchart illustrating a second modification example of an indoor/outdoor determination processing (indoor/outdoor determination method).

The indoor/outdoor determination processing (indoor/outdoor determination method) in the second modification example is expressed by the flowchart in FIG. 16. Specifically, the reception component 52 of the indoor/outdoor determination component 124, 134 receives from the cellular terminal 20 MR including the emission source identification information for the received signal (S21 in FIG. 16), and the specification component 53 counts the number of pieces of emission source identification information included in the received MR and thereby specifies the emission source number N of the received signal (S22). Then, the setting component 57 extracts from the determination database 51 combined information including all of the emission source identification information included in the MR, and sets the lowest number of emission sources included in the extracted combined information as the minimum emission source number Q (S25).

Next, the determination controller 58 determines whether or not the emission source number N is equal to or greater than the minimum emission source number Q (S26). If the emission source number N is equal to or greater than the minimum emission source number M in S26, it can be decided that the cellular terminal 20 has received a signal from at least the minimum emission source number M of emission sources, so it is determined that the cellular terminal 20 is outdoors (S28).

On the other hand, if the emission source number N is less than the minimum emission source number M in S26, it is determined whether or not the emission source number N is less than the minimum emission source number P at which indoor/outdoor determination based on the second indoor/outdoor determination method is possible (S31), and if the emission source number N is less than the minimum emission source number P, it is determined that indoor/outdoor determination based on the second indoor/outdoor determination method is impossible (S33). On the other hand, if in S31 the emission source number N is equal to or greater than the minimum emission source number P, it is determined that indoor/outdoor determination is possible on the basis of the second indoor/outdoor determination method, but that the cellular terminal 20 is indoors since it can be decided that the cellular terminal 20 has not received a signal from at least the minimum emission source number M of emission sources, and the reception state is inferior (S32).

As discussed above, a determination result as to whether the cellular terminal 20 is indoors or outdoors, or whether it cannot be determined, can be quickly obtained by the indoor/outdoor determination processing in FIG. 16. The indoor/outdoor determination with respect to the cellular terminal 20 performed by the indoor/outdoor determination component 124, 134 is not necessarily limited to the method discussed above, and any method can be used as long as it makes use of reception state information indicating the reception state of radio waves at the cellular terminal 20.

What is claimed is:

1. A positioning system for estimating the position of a receiver that has a wireless communication function and a receiving function for signals used in GPS positioning, the system comprising:

first positioning means for estimating the position of the receiver by a first positioning method;

second positioning means for estimating the position of the receiver by a second positioning method;

requirement information input means for inputting requirement information indicating a requirement with respect to estimation of the position of the receiver; and positioning method determination means for determining whether to execute the first or second positioning method on the basis of the requirement information inputted by the requirement information input means, and causing the first positioning means or the second positioning means to execute the estimation of the position of the receiver by the determined positioning method, wherein the first positioning means comprises:

first reception state information acquisition means for acquiring reception state information indicating the reception state of a radio wave by the wireless communication function in the receiver;

first position estimation means for estimating the position of the receiver on the basis of the reception state information acquired by the first reception state information acquisition means, and performing GPS positioning of the receiver on the basis of the reception state of a signal used in GPS positioning and received by the receiver;

first end decision means for deciding whether or not to end the estimation of the position of the receiver by the first position estimation means on the basis of a specific end condition, and if it is decided not to end, causing the first position estimation means to estimate the position of the receiver also on the basis of new reception state information acquired by the first reception state information acquisition means at a different timing from that of the reception state information used to estimate the position by the first position estimation means, and deciding whether or not to end the position estimation by the first position estimation means also on the basis of whether or not GPS positioning by the first position estimation means has been ended;

first indoor/outdoor determination means for determining whether the receiver is indoors or outdoors on the basis of the reception state information acquired by the first reception state information acquisition means; and first end condition determination means for determining the specific end condition on the basis of the result of determination by the first indoor/outdoor determination means, and the second positioning means comprises:

second reception state information acquisition means for acquiring reception state information indicating the reception state of the radio wave by the wireless communication function in the receiver;

second approximate position estimation means for estimating an approximate position of the receiver on the basis of the reception state information acquired by the second reception state information acquisition means, and calculating the precision of the approximate position;

second end decision means for deciding whether or not to end the estimation of the position of the receiver on the basis of the precision calculated by the second approximate position estimation means, and if it is decided to end, ending the estimation of the position of the receiver by using the approximate position estimated by the second approximate position estimation means as the position of the receiver;

second indoor/outdoor determination means for determining whether the receiver is indoors or outdoors on the basis of the reception state information acquired by the second reception state information acquisition means; and second positioning control means for controlling the execution of GPS positioning of the receiver on the basis of the result of decision by the second end decision means and the result of determination by the second indoor/outdoor determination means.

2. The positioning system according to claim 1, wherein the first end condition determination means determines the specific end condition also on the basis of the requirement information inputted by the requirement information input means.

3. The positioning system according to claim 1, wherein the first end condition determination means acquires environment information indicating the environment in which the receiver is placed, and determines the specific end condition also on the basis of the environment information.

4. The positioning system according to claim 1,
wherein the first reception state information acquisition means acquires strength information indicating the reception strength corresponding to an emission source of the radio wave as the reception state information, and the first position estimation means estimates the position of the receiver by storing in advance information indicating the relation between the position and reception strength of the radio wave corresponding to an emission source of the radio wave, and by comparing the strength information acquired by the first reception state information acquisition means with the information stored in advance.

5. The positioning system according to claim 1,
wherein the first end condition determination means determines a threshold of positioning result error and/or an elapsed time of positioning as the specific end condition.

6. The positioning system according to claim 1, further comprising emission source positioning means for acquiring information indicating the size of a communication area of an emission source of the radio wave received by the receiver, estimating the position of the receiver on the basis of the size of the communication area, and deciding whether or not to cause the first positioning means or second positioning means to execute the estimation of the position of the receiver.

7. The positioning system according to claim 1, wherein the second positioning control means controls the execution of positioning that estimates the position of the receiver on the basis of the result of decision by the second end decision means and the result of determination by the second indoor/outdoor determination means and also on the basis of new reception state information acquired by the second reception state information acquisition means, at a timing that differs from that of the reception state information used to estimate the approximate position by the second approximate position estimation means.

8. The positioning system according to claim 7,
wherein the reception state information acquisition means acquires strength information indicating the reception strength corresponding to an emission source of the radio wave as the reception state information, and
the estimation of the approximate position by the approximate position estimation means and the estimation of the position of the receiver which uses the reception state information and the execution of which is controlled by the positioning control means, are carried out by a method in which the position of the receiver is estimated by storing in advance information indicating the relation between the position and reception strength of the radio wave corresponding to the emission source of the radio wave, and by comparing the strength information acquired by the reception state information acquisition means with the information stored in advance.

9. A positioning method for estimating the position of a receiver that has a wireless communication function and a receiving function for signals used in GPS positioning, the method comprising:
a first positioning step of estimating the position of the receiver by a first positioning method;
a second positioning step of estimating the position of the receiver by a second positioning method;
a requirement information input step of inputting requirement information indicating a requirement with respect to estimation of the position of the receiver; and
a positioning method determination step of determining whether to execute the first or second positioning method on the basis of the requirement information inputted in the requirement information input step, and executing the estimation of the position of the receiver by the determined positioning method in the first positioning step or the second positioning step,
wherein the first positioning step comprises:
a first reception state information acquisition step of acquiring reception state information indicating the reception state of a radio wave by the wireless communication function in the receiver;
a first position estimation step of estimating the position of the receiver on the basis of the reception state information acquired in the first reception state information acquisition step, and performing GPS positioning of the receiver on the basis of the reception state of a signal used in GPS positioning and received by the receiver;
a first end decision step of deciding whether or not to end the estimation of the position of the receiver in the first position estimation step on the basis of a specific end condition, and if it is decided not to end, estimating the position of the receiver in the first position estimation step also on the basis of new reception state information acquired in the first reception state information acquisition step at a different timing from that of the reception state information used to estimate the position in the first position estimation step, and deciding whether or not to end the position estimation in the first position estimation step also on the basis of whether or not GPS positioning in the first position estimation step has been ended;
a first indoor/outdoor determination step of determining whether the receiver is indoors or outdoors on the basis of the reception state information acquired in the first reception state information acquisition step; and
a first end condition determination step of determining the specific end condition on the basis of the result of determination in the first indoor/outdoor determination step,
and the second positioning step comprises:
a second reception state information acquisition step of acquiring reception state information indicating the reception state of the radio wave by the wireless communication function in the receiver;
a second approximate position estimation step of estimating an approximate position of the receiver on the basis of the reception state information acquired in the second reception state information acquisition step, and calculating the precision of the approximate position;
a second end decision step of deciding whether or not to end the estimation of the position of the receiver on the basis of the precision calculated in the second approximate position estimation step, and if it is decided to end, ending the estimation of the position of the receiver by using the approximate position estimated in the second approximate position estimation step as the position of the receiver;
a second indoor/outdoor determination step of determining whether the receiver is indoors or outdoors on the basis of the reception state information acquired in the second reception state information acquisition step; and
a second positioning control step of controlling the execution of GPS positioning of the receiver on the basis of the result of decision in the second end decision step and the result of determination in the second indoor/outdoor determination step.

* * * * *